United States Patent [19]
Spindt et al.

[11] Patent Number: 5,564,959
[45] Date of Patent: Oct. 15, 1996

[54] USE OF CHARGED-PARTICLE TRACKS IN FABRICATING GATED ELECTRON-EMITTING DEVICES

[75] Inventors: Christopher J. Spindt, Menlo Park; John M. Macaulay, Palo Alto; Robert M. Duboc, Jr., Menlo Park, all of Calif.; Peter C. Searson, Baltimore, Md.

[73] Assignee: Silicon Video Corporation, San Jose, Calif.

[21] Appl. No.: 269,229

[22] Filed: Jun. 29, 1994

Related U.S. Application Data

[63] Continuation-in-part of Ser. No. 118,490, Sep. 8, 1993, Pat. No. 5,462,467, and Ser. No. 158,102, Nov. 24, 1993, Pat. No. 5,559,389.

[51] Int. Cl.$^6$ .................................................. H01J 9/02
[52] U.S. Cl. ................................................ 445/24; 455/50
[58] Field of Search .................. 445/50, 24; 313/309, 313/336

[56] References Cited

U.S. PATENT DOCUMENTS

| | | | |
|---|---|---|---|
| 3,303,085 | 2/1967 | Price et al. | 428/131 |
| 3,407,125 | 10/1968 | Fehlner | 205/103 |
| 3,497,929 | 3/1970 | Shoulders | 29/25.17 |

(List continued on next page.)

FOREIGN PATENT DOCUMENTS

| | | | |
|---|---|---|---|
| 351110A1 | 1/1990 | European Pat. Off. | H01J 9/02 |
| 415625A2 | 3/1991 | European Pat. Off. . | |
| 508737A1 | 4/1992 | European Pat. Off. . | |
| 2951287A1 | 7/1981 | Germany | H01J 1/30 |
| 4209301C1 | 8/1993 | Germany | H01J 29/50 |
| WO92/02030 | 2/1992 | WIPO | H01J 1/30 |
| WO93/18536 | 9/1993 | WIPO | 313/311 |

OTHER PUBLICATIONS

Possin, "A Method for Forming Very Small Diameter Wires," *Rev. Sci. Instrum.*, 1970, pp. 772–774.

Williams et al, "Fabrication of 80 Å metal wires," *Rev. Sci. Instrum.*, Mar. 1984, p. 410–412.

Shiraki et al, "Perpendicular Magnetic Media by Anodic Oxidation Method and Their Recording Characteristics," *IEEE Trans. Mags.*, Sep. 1985, p. 1465–1467.

Tsuya et al, "Alumite Disc Using Anordic [sic] Oxidation," *IEEE Trans. Mags.*, Sep. 1986, pp. 1140–1145.

Arai et al, "Magnetic Properties of Iron Electro–Deposited Alumite Films," *IEEE Trans. Mags.*, Sep. 1987, pp. 2245–2247.

Cochran et al, "Low–voltage field emission from tungsten fiber arrays in a stabilized zirconia matrix," *J. Mater. Res.*, May/Jun. 1987, pp. 322–328.

Penner et al. "Preparation and Electrochemical Characterization of Ultramicroelectrode Ensembles," *Anal. Chem.*, 1 Nov. 1987, p. 2625–2630.

(List continued on next page.)

*Primary Examiner*—Kenneth J. Ramsey
*Attorney, Agent, or Firm*—Skjerven, Morrill, MacPherson, Franklin & Friel; Alan H. MacPherson; Ronald J. Meetin

[57] ABSTRACT

Gated electron emitters are fabricated by processes in which charged particles are passed through a track layer (24, 48, or 144) to form charged-particle tracks ($26_1$, $50_1$, or $146_1$). The track layer is etched along the tracks to create open spaces ($28_1$, $52_1$, or $148_1$). Electron-emissive elements (30 or 142D) can then be formed at locations respectively centered on the open spaces after which a patterned gate layer (34B, 40B, or 158C) is provided. Alternatively, the open spaces in the track layer can be employed to etch corresponding apertures ($54_1$) through an underlying non-insulating layer (46) which typically serves as the gate layer. An etch is performed through the apertures to form dielectric open spaces ($56_1$, $96_1$, or $114_1$) in an insulating layer (24) that lies below the non-insulating layer. Electron-emissive elements (30B, $30/88D_1$, $98/102_1$, or $118_1$) can subsequently be provided, typically in the dielectric open spaces.

40 Claims, 18 Drawing Sheets

U.S. PATENT DOCUMENTS

| | | | |
|---|---|---|---|
| 3,562,881 | 2/1971 | Barrington et al. | 445/52 |
| 3,755,704 | 8/1973 | Spindt et al. | 313/309 |
| 4,008,412 | 2/1977 | Yuito et al. | 313/309 |
| 4,338,164 | 7/1982 | Spohr | 313/346 R |
| 4,345,181 | 8/1982 | Shelton | 313/309 |
| 4,668,957 | 5/1987 | Spohr | 343/909 X |
| 4,732,646 | 3/1988 | Elsner et al. | 156/626 |
| 4,874,981 | 10/1989 | Spindt | 313/309 |
| 4,940,916 | 7/1990 | Borel et al. | 313/306 |
| 5,019,003 | 5/1991 | Chason | 445/24 |
| 5,053,673 | 10/1991 | Tomii et al. | 313/308 |
| 5,129,850 | 7/1992 | Kane et al. | 445/24 |
| 5,141,460 | 8/1992 | Jaskie et al. | 445/24 |
| 5,142,184 | 8/1992 | Kane | 313/336 X |
| 5,150,019 | 9/1992 | Thomas et al. | 313/309 X |
| 5,150,192 | 9/1992 | Greene et al. | 315/350 |
| 5,164,632 | 11/1992 | Yoshida et al. | 313/309 |
| 5,170,092 | 12/1992 | Tomii et al. | 313/310 |
| 5,194,780 | 3/1993 | Meyer | 313/309 |
| 5,199,917 | 4/1993 | MacDonald | 445/50 X |
| 5,199,918 | 4/1993 | Kumar | 445/50 |
| 5,202,571 | 4/1993 | Hirabayashi et al. | 257/200 X |
| 5,211,707 | 5/1993 | Ditchek et al. | 445/24 |
| 5,228,877 | 7/1993 | Allaway et al. | 445/24 |
| 5,252,833 | 10/1993 | Kane et al. | 250/423 F |
| 5,277,638 | 1/1994 | Lee | 445/50 X |
| 5,278,475 | 1/1994 | Jaskie et al. | 313/308 X |

OTHER PUBLICATIONS

Chakarvarti et al, "Morphology of etched pores and microstructures fabricated from nuclear track filters," *Nucl. Instr. & Meth. Phys. Res.*, 1991, pp. 209–115.

Kirkpatrick et al, "Vacuum field emission from a Si–TaSi$_2$ semiconductor–metal eutectic composite," *Appl. Phys., Lett.*, Oct. 1991, pp. 2094–2096.

Hill et al, "A Low Voltage Field Emitter Array Cathode for High Frequency Applications," Abstract 6.5, 5th Int'l Vac. Microelec. Conf., 13–17 Jul. 1992, 2 pp.

Sune et al, "Fabrication of Silicon–Column–Field Emitters for Microwave Applications," *Tech. Dig. 6th Int'l. Vac. Microelec. Conf.*, 12–15 Jul. 1993, pp. 15–16.

Chakarvarti et al, "Microfabrication of metal–semiconductor heterostructures and tubules using nuclear track filtrs," *J. Micromech. Microeng.*, 1993, pp. 57–59.

Spohr, *Ion Tracks and Microtechnology, Principles an Applications* (Viewig), edited by K. Bethge, 1990, pp. 246–255.

Busta, "Vacuum microelectronics—1992," *J. Micromech. Microeng.*, 1992, pp. 43–74.

Fischer, "Production and use of nuclear tracks; imprinting structure on solids," *Reviews of Modern Phys.*, Oct. 1993, pp. 907–948.

Betsui, "Fabrication and Characteristics of Si Field Emitter Arrays," *Tech. Dig. of IVMC91*, 1991, pp. 26–29.

Whitney et al, "Fabrication and Magnetic Properties of Arrays of Metallic Nanowires," *Science*, 3 Sep. 1993, pp. 1316–1319.

Utsami, "Vacuum Microelectronics; What's New and Exciting," *IEEE Trans. on Electron. Devcs.*, Oct. 1991, pp. 2276–2283.

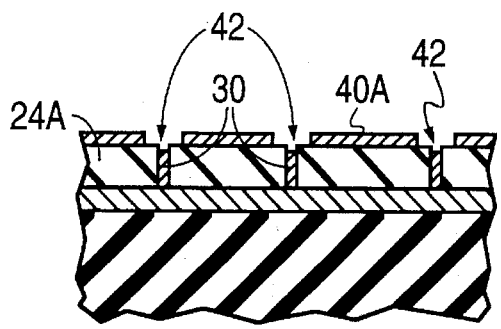
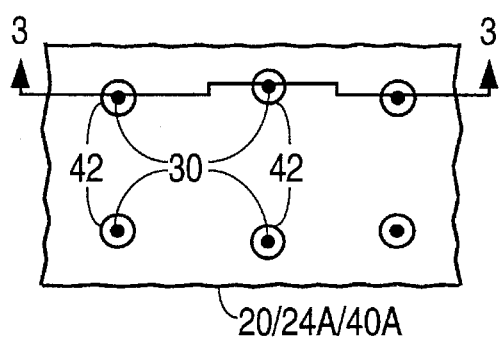
FIG. 3d    FIG. 4d
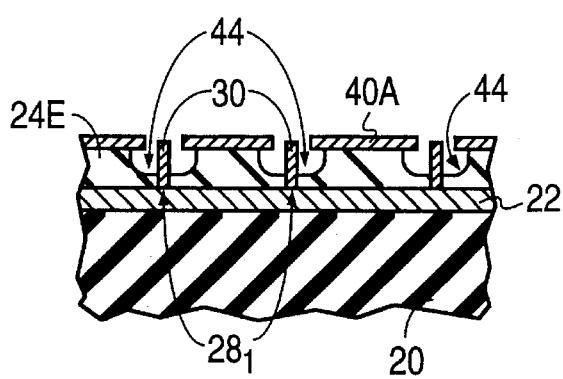
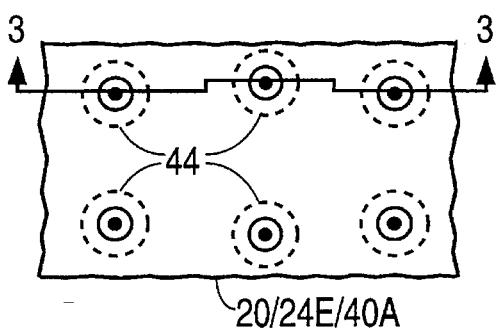
FIG. 3e    FIG. 4e
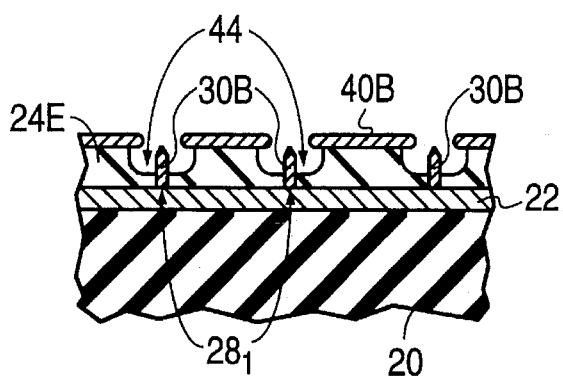
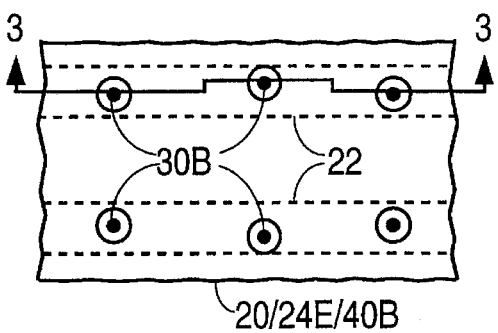
FIG. 3f    FIG. 4f

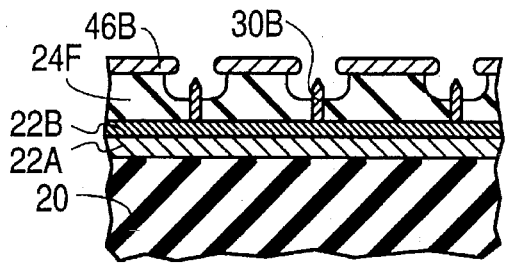
FIG. 14.1
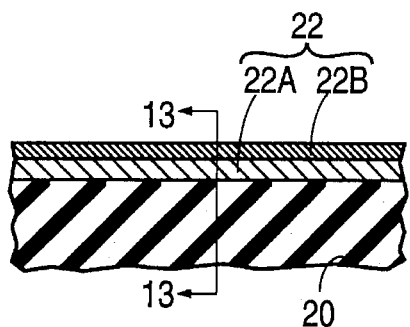
FIG. 12
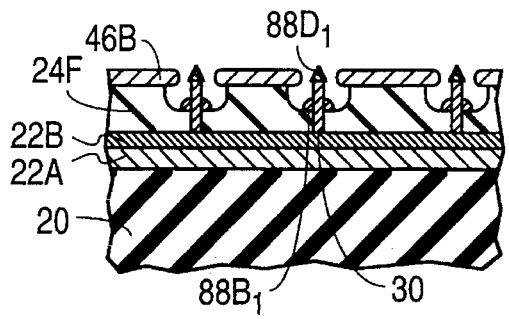
FIG. 14.2
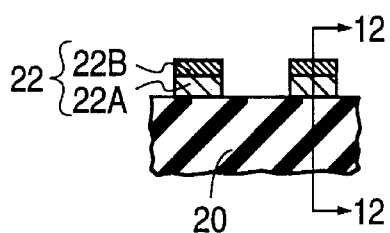
FIG. 13
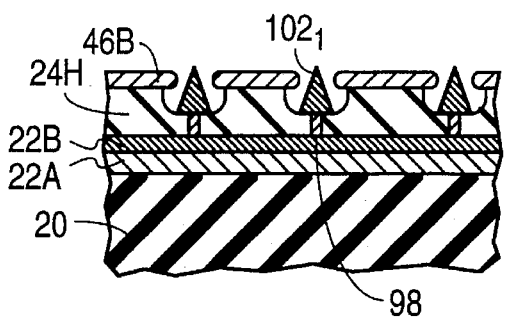
FIG. 14.3
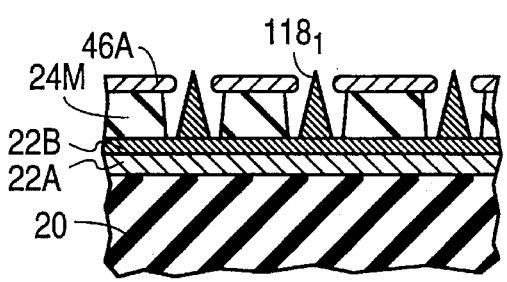
FIG. 14.4

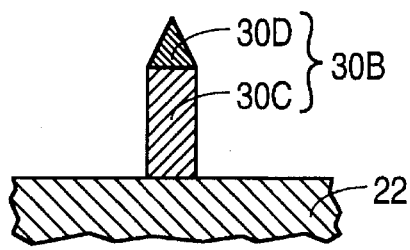
FIG. 15.1
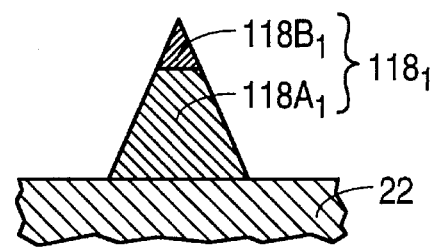
FIG. 15.2
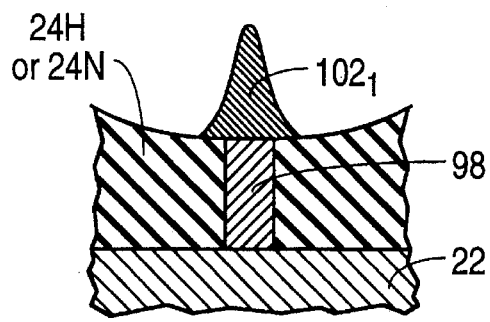
FIG. 16.1
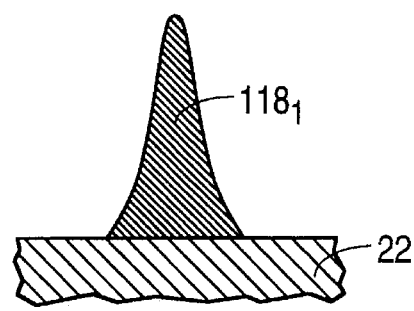
FIG. 16.2

30B
FIG. 17.1
30B
FIG. 17.2
30B
FIG. 17.3
30B
FIG. 17.4
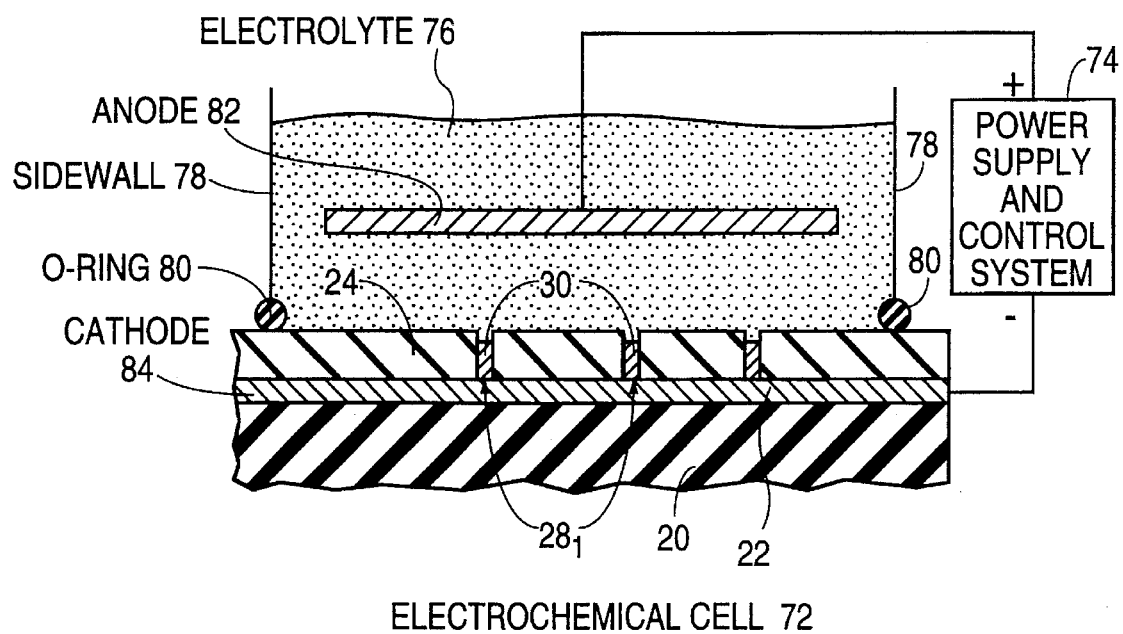
FIG. 18

USE OF CHARGED-PARTICLE TRACKS IN FABRICATING GATED ELECTRON-EMITTING DEVICES

CROSS-REFERENCE TO RELATED APPLICATIONS

This is a continuation-in-part of both U.S. patent application Ser. No. 08/118,490, filed 8 Sep. 1993, now U.S. Pat. No. 5,462,467, and U.S. patent application Ser. No. 08/158, 102, filed 24 Nov. 1993, now U.S. Pat. No. 5,559,389, and is related to Spindt et al, co-filed U.S. patent application Ser. No. 269,311 "Fabrication of Electron-emitting Structures Using Charged-Particle Tracks and Removal of Emitter Material," filed 29 Jun. 1994, now allowed. To the extent not repeated herein, the contents of these three related applications are incorporated by reference herein.

FIELD OF USE

This invention relates to electron emission. More particularly, this invention relates to techniques for manufacturing electron-emitting devices, commonly referred to as cathodes, suitable for products such as cathode-ray tube ("CRT") displays of the flat-panel type.

BACKGROUND ART

Cathodes can emit electrons by photoemission, thermionic emission, and field emission, or as the result of negative electron affinity. A field-emission cathode (or field emitter) supplies electrons when subjected to an electric field of sufficient strength. The electric field is created by applying a suitable voltage between the cathode and an electrode, typically referred to as the anode or gate electrode, situated a short distance away from the cathode.

When used in a flat-panel display such as a flat-panel television or video monitor, a field emitter typically contains a group, often a very large group, of individual electron-emissive elements distributed across a supporting structure. This configuration is referred to here as an area field emitter. Busta, "Vacuum microelectronics—1992," *J. Micromech. Microeng.*, Vol. 2, 1992, pp. 43–74, describes a number of different techniques that have been investigated for manufacturing electron-emissive elements in gated area field emitters.

Fischer et al, "Production and use of nuclear tracks: imprinting structure on solids," *Rev. Mod. Phys.*, October 1983, pp. 907–948, describes how nuclear tracks are employed in manufacturing field emitters according to a replica technique. In Fischer et al, nuclear tracks are formed through a substrate. The tracks are etched to create cavities in the substrate after which metal is deposited on the substrate to create a film that extends across the substrate and fills the cavities. The substrate is then removed. The metal film, including the resultant metal protrusions, form an area field emitter as a replica of the substrate.

Some area field emitters employ elongated electron-emissive elements. For example, Yoshida et al, U.S. Pat. No. 5,164,632, discloses a gated field emitter in which solid elongated electron-emissive elements are created in pores extending through a dielectric layer. Greene et al, U.S. Pat. No. 5,150,192, uses hollow elongated electron-emissive elements.

Other area field emitters utilize generally conical electron-emissive elements. See Spindt et al, U.S. Pat. No. 3,665,241. Also see Borel, U.S. Pat. No. 4,940,916; Betsui, "Fabrication and Characteristics of Si Field Emitter Arrays," *Tech Dig. IVMC 91*, pp. 26–29; and Fukuta et al, European Patent Publication 508,737 A1.

In yet other area field emitters, electron-emissive particles of various shapes and/or sizes are distributed across a supporting layer at the bottoms of openings that extend through a gate structure overlying the supporting layer. Chason, U.S. Pat. No. 5,019,003, discloses an example of this type of field emitter. Other such examples are disclosed in Thomas et al, U.S. Pat. No. 5,150,019; Jaskie et al, U.S. Pat. No. 5,278,475; and Kane et al, U.S. Pat. No. 5,252,833.

When a portion of a gated area field-emission device in a flat-panel CRT is actively emitting electrons as the result of a suitable applied extraction voltage, the current density produced by emitted electrons ideally should be uniform across the activated portion. In a real field emitter, the emission current density typically becomes more uniform as the emitter packing density—i.e., the number of electron-emission elements per unit area—increases and, correspondingly, as the lateral area occupied by an electron-emissive element decreases.

In manufacturing high-quality prior art gated electron emitters, use of technologies such as photolithography typically places severe restrictions on the minimum lateral size of electron-emissive features such as an electron-emissive element or an opening for an electron-emissive element, especially in a volume production environment. More specifically, depth of field, sometimes referred to as depth of focus, is commonly employed in characterizing radiation-based patterning techniques such as photolithography. Briefly stated, the depth of field is the (maximum) distance, measured along the optic axis, across which an acceptable pattern can be obtained on a generally flat surface situated, generally orthognal to the optic axis, at any point along that distance.

The depth of field in photolithography is finite and, in particular, is relatively small compared to what would be desirable for efficient manufacturing of area electron emitters on a production scale. Consider an electron-emitting device in which the total area of the surface to be photolithographically patterned is several square centimeters or more. The flatness of the surface being patterned, the presence of features on the surface, and the alignment of the surface in the photolithographic radiation-exposure combined with the small photolithographic depth of field significantly limit the minimum lateral size of features photolithographically defined at the surface using a single radiation exposure.

Finer photolithographic patterns can be obtained by exposing small parts of the total area to the patterning radiation in separate expose-and-move steps. However, such an expose-and-move process is time-consuming and therefore expensive because it requires re-alignment and re-focus before each exposure.

As an example, the conical electron-emissive elements in Betsui and Fukuta et al appear to have a photolithographically defined base diameter of 1–3 μm. It is desirable to overcome these limitations so as to be able to fabricate high-quality gated area electron emitters having smaller lateral electron-emissive features. It is also desirable to increase the emitter packing density so as to attain more uniform emission current density.

GENERAL DISCLOSURE OF THE INVENTION

The present invention furnishes a set of processes for manufacturing gated electron-emitting devices utilizing charged-particle tracks to define locations for electron-emissive features—e.g., an electron-emissive element or an opening for one or more electron-emissive elements—in the gated electron-emitting device. Use of charged-particle tracks typically enables the lateral areas of the electron-emissive elements to be made quite small. For example, each track-defined electron-emissive element in the invention typically occupies a lateral area having a mean diameter of 0.1–0.2 μm and thus occupies considerably less area than each electron-emissive element in prior art gated electron emitters such as those of Betsui and Fukuta et al.

One item contributing to the small lateral area occupied by an electron-emissive element in the invention is the fact that a charged-particle track constitutes a damaged zone whose mean diameter is typically on the nanometer scale. Furthermore, in contrast to photolithography where the depth of field is finite and, in fact, is relatively small, the depth of field is effectively infinite for charged-particle tracks. As a result, depth of field does not place any significant practical limitations on the minimum lateral emitter feature size attainable in the invention. Creating and etching the charged-particle tracks is no more complex than utilizing photolithography.

An electron emitter fabricated according to the invention is furnished with a gate electrode having gate openings that provide access to the electron-emissive elements. Preferably, the gate openings are self-aligned to the electron-emissive elements or to openings in which the electron-emissive elements are situated. The manufacturing processes of the invention are suitable for commercial volume production of gated area electron-emitting devices for CRT applications such as flat-panel displays. In short, the invention provides a large advance over the prior art.

Specifically, in one aspect of the invention, charged particles are passed through a track layer to provide the track layer with a multiplicity of charged-particle tracks. The track layer is etched along the charged-particle tracks to create corresponding open spaces through the track layer. Electron-emissive elements are then formed at locations respectively centered on the open spaces.

For example, each electron-emissive element can be formed in a corresponding one of the open spaces through the track layer. Formation of the electron-emissive elements thereby broadly entails creating the electron-emissive elements in such a way that they are accessible through the open spaces. Alternatively, the electron-emissive elements can be defined in an emitter region provided below the track layer.

A patterned gate layer is subsequently created over the electron-emissive elements. Gate openings extend through the gate layer in such a way that each gate opening exposes one or more of the electron-emissive elements. Preferably, each gate opening is centered on a corresponding one of the electron-emissive elements. Various processing techniques that key on the electron-emissive elements are employed to create the gate openings in this manner.

In another aspect of the invention, apertures are created through a track layer by forming and etching charged-particle tracks as described above. At this point, the processing sequence diverges from the first-mentioned aspect of the invention in that gate openings are formed through a gate layer underlying the track layer after which electron-emissive elements are created. This is opposite to the first aspect in which the electron-emissive elements are formed before creating gate openings through the gate layer.

For example, the gate openings in the second-mentioned aspect of the invention can be formed at locations centered on the apertures through the track layer. Material is then deposited through the gate openings in a manner aligned to the gate openings to at least partially form the electron-emissive elements.

A further aspect of the invention likewise begins with creating apertures through a track layer by forming and etching charged-particle tracks in the above-described manner. An underlying electrically non-insulating layer, typically a gate layer, is etched through the apertures to form corresponding further apertures through the non-insulating layer. As discussed further below "electrically non-insulating" means electrically conductive or electrically resistive here.

An underlying electrically insulating layer is then etched through the further apertures, typically gate openings, to form corresponding dielectric open spaces through the insulating layer down to an underlying lower electrically non-insulating region. Electron-emissive elements are typically provided over the lower non-insulating region in such a way that they are electrically coupled to it.

The small size of the electron-emissive elements in an electron emitter fabricated according to the present invention provides a number of advantages. For example, the operating voltages can be considerably lower than that achievable with otherwise equivalent electron emitters of the prior art. Importantly, the emitter packing density can be considerably higher than in the prior art. This produces a much more uniform emission current density across the electron emitter.

The gate layer is typically self-aligned to the electron-emissive features. The size and spacing of the electron-emissive features is not limited by technologies such as photolithography. As a result, the components of the electron emitter can be manufactured at lateral dimensions on the nanometer scale. The fabrication process of the invention is also simple.

BRIEF DESCRIPTION OF THE DRAWINGS

FIGS. 3a–3f are cross-sectional front views representing an alternative set of steps performable on the structure of FIGS. 1f and 2f in fabricating a gated area field emitter according to the invention.

FIGS. 4a–4f are plan views respectively corresponding to FIGS. 3a–3f. The cross sections of FIGS. 3a–3f are taken through stepped plane 3—3 in FIGS. 4a–4f.

FIGS. 12 and 13 are cross-sectional front and side views depicting how the initial structure of FIG. 1a or 5a appears when the lower non-insulating region consists of an electrically conductive part and an electrically resistive part. The cross section of FIG. 12 is taken through plane 12—12 in FIG. 13. The cross section of FIG. 13 is taken through plane 13—13 in FIG. 12.

FIGS. 14.1–14.4 are cross-sectional front views respectively depicting how the final structures of FIGS. 5j, 7e, 9h, and 10e appear when they contain the two-part lower non-insulating region of FIG. 12.

FIGS. 15.1 and 15.2 are expanded cross-sectional front views of alternative electron-emissive elements employable in the present field emitters where each electron-emissive element consists of an electrically resistive portion and an overlying electron-emissive portion.

FIGS. 16.1 and 16.2 are expanded cross-sectional front views of alternative shapes for electron-emissive cones in the present field emitters.

FIGS. 17.1–17.4 are cross-sectional longitudinal views of differently shaped electron-emissive filaments usable in the field-emission structures of FIGS. 1k, 3f, and 5j.

FIG. 18 is a functional diagram for the components of an electrochemical deposition system used in the invention.

Like reference symbols are employed in the drawings and in the description of the preferred embodiments to represent the same, or very similar, item or items.

DESCRIPTION OF THE PREFERRED EMBODIMENTS

Figure 1A:
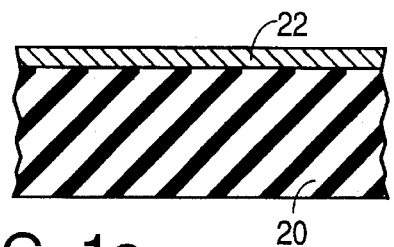
FIGS. 1a–1k are cross-sectional front views representing steps in fabricating a gated area field emitter according to the invention.

The following definitions are used in the description below. The "mean diameter" for a two-dimensional item of non-circular shape is the diameter of a circle of the same area as the non-circular item. The "mean diameter" for a three-dimensional item of non-spherical shape either is the diameter of a sphere of the same volume as the non-spherical item or is the diameter of a right circular cylinder of the same volume as the item. The equal-volume cylinder diameter is generally used when the item is cylindrical or considerably elongated.

Herein, the term "electrically insulating" (or "dielectric") generally applies to materials having a resistivity greater than $10^{10}$ ohm-cm. The term "electrically non-insulating" thus refers to materials having a resistivity below $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 1 volt/μm.

Examples of electrically conductive materials (or electrical conductors) are metals, metal-semiconductor compounds (such as metal silicides), and metal-semiconductor eutectics (such as gold-germanium). Electrically conductive materials also include semiconductors doped (n-type or p-type) to a moderate or high level. Electrically resistive materials include intrinsic and lightly doped (n-type or p-type) semiconductors. Further examples of electrically resistive materials are cermet (ceramic with embedded metal particles), other such metal-insulator composites, graphite, amorphous carbon, and modified (e.g., doped or laser-modified) diamond.

Referring to the drawings, FIGS. 1a–1k (collectively "FIG. 1") and FIGS. 2a–2k (collectively "FIG. 2") illustrate a process for manufacturing a gated field-emission cathode structure using charged-particle tracks according to the teachings of the invention. The field-emission structure is typically used to excite phosphors on a face plate in a CRT of a flat-panel display such as a flat-panel television or a flat-panel video monitor for a personal computer, a lap-top computer, or a work station.

The starting point for the fabrication process is an electrically insulating substrate 20 typically consisting of ceramic or glass. Substrate 20 is typically configured as a plate having a largely flat upper surface and a largely flat lower surface substantially parallel to the upper surface. In a flat-panel CRT display, substrate 20 constitutes at least part of the backplate (or baseplate).

Substrate 20 furnishes support for the field-emission structure. As such, the substrate thickness is at least 500 µm. In a 25-cm (diagonal) flat-panel CRT display where internal supports are placed between the phosphor-coated face plate and the field emitter, the substrate thickness is typically 1–2 mm. If substrate 20 provides substantially the sole support for the field emitter, the substrate thickness is typically 4–14 mm.

Figure 2A:
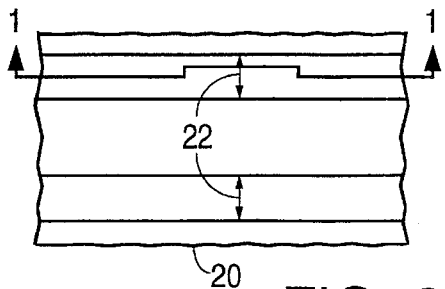
FIGS. 2a–2k are plan views respectively corresponding to FIGS. 1a–1k. The cross sections of FIGS. 1a–1k are taken through stepped plane 1—1 in FIGS. 2a–2k.
Figure 2B:
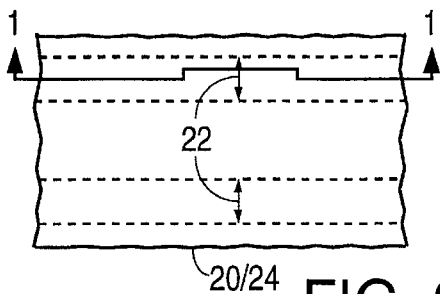

A lower electrically non-insulating region 22 is formed along the top of substrate 20 as indicated in FIGS. 1a and 2a. Lower non-insulating region 22 usually consists of an electrical conductor, preferably a metal such as chromium. In this case, the thickness of region 22 is 0.05–1.5 µm. Other candidates for region 22 include tantalum, tungsten, nickel, and molybdenum. Region 22 could also be formed with (a) conductively doped (i.e., moderately or heavily doped) semiconductor material such as n-type or p-type silicon, (b) metal-semiconductor compounds such as metal silicides, or/and (c) metal-semiconductor eutectics such as gold-germanium.

Lower non-insulating region 22 is typically a patterned layer containing a group of parallel lines, of which two such lines are depicted in FIG. 2a. When region 22 is configured in this way, the final field-emission structure is particularly suitable for selectively exciting phosphors in a flat-panel display. These lines are typically no more than 300 µm wide for a 25-cm flat-panel display. Nonetheless, region 22 can be arranged in various other patterns, or can even be unpatterned.

A largely homogeneous electrically insulating track (or track-recording) layer 24 is formed on the top of the structure. See FIGS. 1b and 2b. Parts of insulating track layer 24 are situated on both substrate 20 and lower non-insulating region 22. The thickness of layer 24 is 0.1–2 µm. Suitable dielectric materials for track layer 24 fall into three groups: (a) organic polymers such as polycarbonate, polystyrene, and cellulose acetate, (b) inorganic glasses such as phosphate, silicate, soda-lime, and spin-on glasses, and (c) crystals such as mica and quartz. Preferably, layer 24 consists of inorganic glass having a thickness of 1 µm.

Figure 1B:
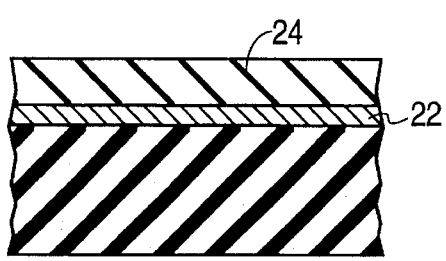
Figure 1C:
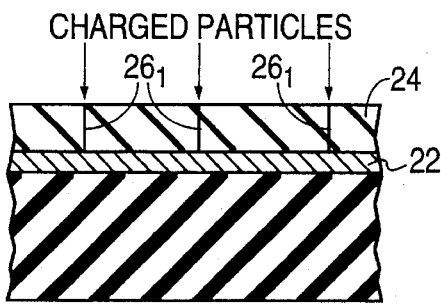
Figure 2C:
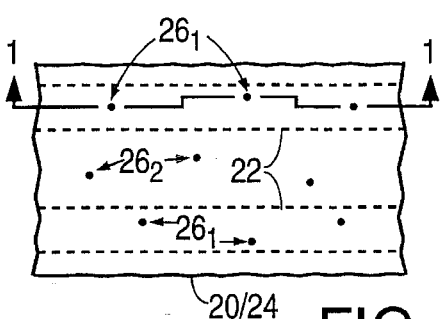
Figure 1D:
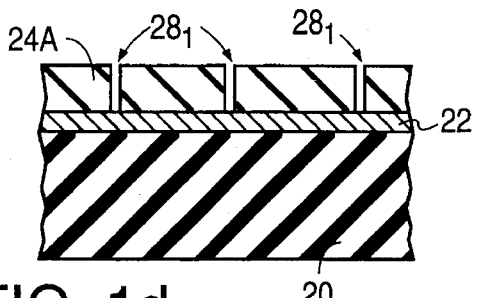

Insulating track layer 24 is subjected to energetic charged particles that impinge on the top of layer 24 in a direction largely perpendicular to the lower surface of substrate 20 and thus in a direction generally perpendicular to the upper structural surface. The charged particles have sufficient energy to form straight tracks through layer 24 at random locations across layer 24. The charged-particle tracks constitute damaged zones created along the paths of the charged particles. Each track has a heavily damaged core whose mean diameter is in the vicinity of 4 nm. As shown in FIGS. 1c and 2c, the tracks consist of (a) charged-particle tracks $26_1$ through the portions of layer 24 overlying non-insulating region 22 and (b) charged-particle $26_2$ through the portions of layer 24 directly overlying substrate 20.

Charged-particle tracks $26_1$ and $26_2$ (collectively "26") extend parallel to one another in a direction generally perpendicular to the upper structural surface. Although charged-particle tracks 26 are randomly distributed across insulating track layer 24, they have a well-defined average spacing. The track density is usually in the range of $10^6$–$10^9$ tracks/cm$^2$. A typical value falls in the narrower range of $10^7$–$10^8$ tracks/cm$^2$ which yields an average track spacing of approximately 1–3 µm. For illustrative purposes, only a very small portion of tracks 26 are indicated in FIGS. 1c and 2c.

The charged particles penetrate into the material below insulator 24. Such penetration is not material here and, accordingly, is not shown in the drawings.

In a typical implementation, a charged-particle accelerator which forms a well-collimated beam of ions is employed to form tracks 26. The ion beam is scanned uniformly across insulating track layer 24. The preferred charged-particle species is doubly ionized argon ($Ar^{++}$) at an energy of 8 MeV. Alternatively, tracks 26 could be created from a collimated source of nuclear fission particles produced, for example, by the radioactive element californium 252.

Insulating track layer 24 is brought into contact with (e.g., by immersion) a suitable chemical etchant that attacks the damaged insulating material along tracks 26 much more than the undamaged material of layer 24. Pores $28_1$ and $28_2$ are thereby etched through layer 24 respectively along tracks $26_1$ and $26_2$. See FIGS. 1d and 2d. For illustrative purposes, the lateral dimensions of pores $28_1$ and $28_2$ (collectively "28") compared to the widths of the lines that form conductive layer 20 are greatly exaggerated in the plan-view drawings. The remainder of layer 24 now constitutes homogeneous porous insulating track layer 24A.

Figure 2D:
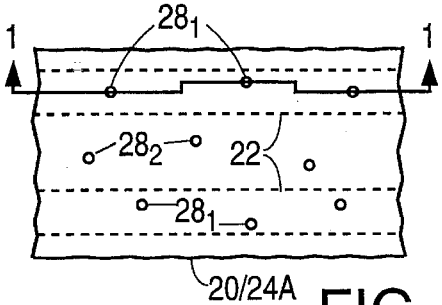
Figure 1E:
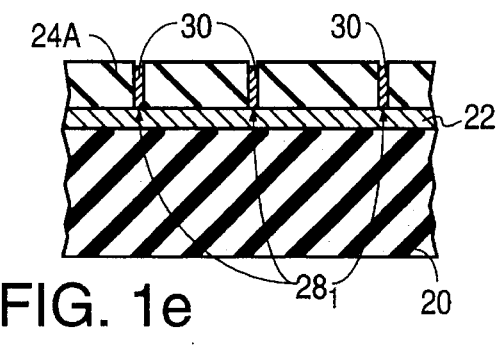

Pores 28 are generally circular in shape as viewed from the top in the plan view of FIG. 2d. Depending on how the track etching is done, pores 28 can be cylindrical or (slightly) conical in three dimensions. For purposes of illustration, pores 28 are represented as cylinders in the drawings. The pore diameter can vary from 4 nm to 2 µm. Preferably, the pore diameter lies in the range of 10–200 nm. A typical value is 100 nm.

The etchant used for creating pores 28 preferably does not significantly attack substrate 20 or non-insulating region 22. When components 20, 22, and 24A respectively consist of ceramic, chromium, and polycarbonate, the etching is done in 6.25 normal sodium hydroxide at 50° C. The etch time is less than 10 minutes for the typical 1-µm track-layer thickness.

Solid electron-emissive metal filaments 30 are formed in pores $28_1$, which overlie non-insulating region 22, by electrochemically depositing a suitable filament material. See FIGS. 1e and 2e. The deposition is performed in an electrochemical cell, described below, in which non-insulating region 22 acts as a deposition cathode. After bringing the structure into contact with the cell electrolyte and activating the cell, current flows between cathode 22 and a separate anode. The filament material uniformly builds up in pores $28_1$ starting from non-insulating region 22. The lower ends of filaments 30 contact region 22.

Figure 2E:
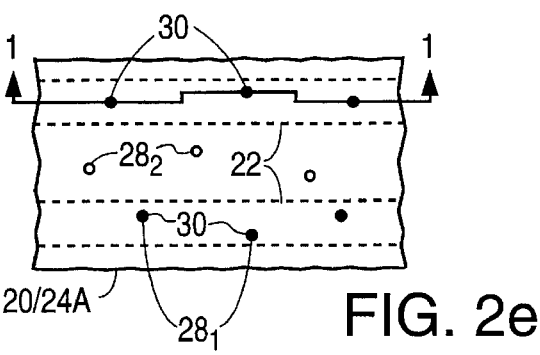

Substantially none of the filament material accumulates in pores $28_2$ directly above substrate 20 because there is no electrical contact at the bottoms of pores $28_2$. In FIG. 2e, the dark circles represent filaments 30 in filled pores $28_1$, while the light circles represent empty pores $28_2$. The use of conductive layer 22 as the cathode during the electrochemical deposition enables the deposition to be selective.

The electrochemical deposition is typically performed for a time sufficient to enable the upper ends of pores 30 to be nearly coplanar with the top of porous track layer 24A. This situation is illustrated in FIG. e. The deposition can, however, be performed for a longer time so that filaments 30 bulge slightly out of pores $28_1$ or for a shorter time so that the upper ends of filaments 30 are significantly below the top of layer 24A.

The upper ends of filaments 30 are preferably formed with a noble metal. In a typical implementation, the upper ends of filaments 30 consist of platinum when non-insulating region 22 is chromium. Other candidate noble metals for the upper filament ends are gold and palladium. The remaining portions of filaments 30 typically consist of the same (noble) metal as the upper ends but can be formed with another metal such as nickel, copper, cobalt, molybdenum, or niobium.

Elements 30 are true filaments for which the ratio of length to maximum diameter is at least 2 and normally at least 3. The length-to-maximum-diameter ratio is preferably 5 or more. Filaments 30 are typically cylinders of circular transverse cross section. Nonetheless, the transverse cross section can be somewhat non-circular. In any case, the ratio of maximum diameter to minimum diameter for each filament 30 is usually no more than 2.

Filaments 30 are all of substantially the same length. The filament length is 0.1–2 µm, typically 1 µm. In this regard, the average track spacing and, consequently, the average filament spacing are arranged to be somewhat greater than the filament length.

In order to create a gate electrode for the structure, electrically conductive caps 32 are electrochemically deposited respectively on filaments 30. See FIGS. 1f and 2f. Caps 32 are generally circular in shape as viewed from the top in FIG. 2f.

Each cap 32 is centered on the upper end of corresponding filament 30. Along the upper surface of track layer 24A, each cap 32 also reaches a greater diameter than underlying filament 30. As a result, each cap 32 has a lateral periphery that encloses the lateral periphery of underlying filament 30 along the top of layer 24A. Typically, the average diameter of caps 30 along the top of layer 24A is at least 1.5 times the average diameter of filaments 30.

The electrochemical deposition to create caps 32 is performed in an electrochemical cell, again described below, in which filaments 30 (attached to non-insulating region 22) act as a cathode. After the structure has been brought into contact with the cell electrolyte and the cell has been activated, current flows between filaments 30 and a separate anode. The cap material thereby builds up on filaments 30 until the desired cap diameter is reached.

Caps 32 consist of a metal different from the filament metal along the upper ends of filament 30. In particular, the cap metal is selectively etchable with respect to the directly underlying filament metal. When filaments 30 consist of platinum, caps 32 are formed with a metal such as silver whose half-cell potential is less positive than that of platinum.

Figure 1F:
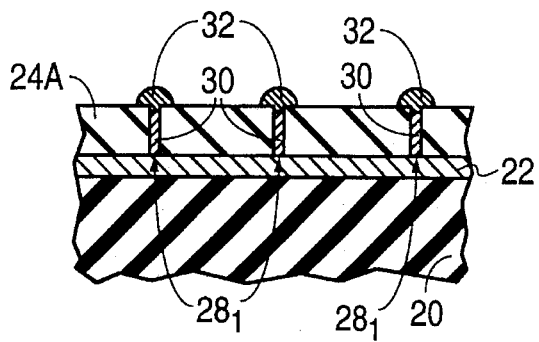
Figure 2F:
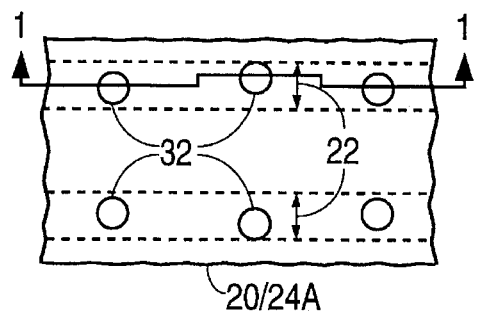
Figure 1G:
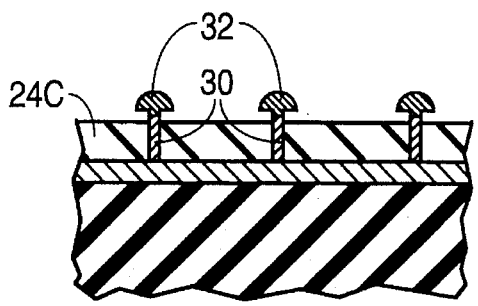
Figure 2G:
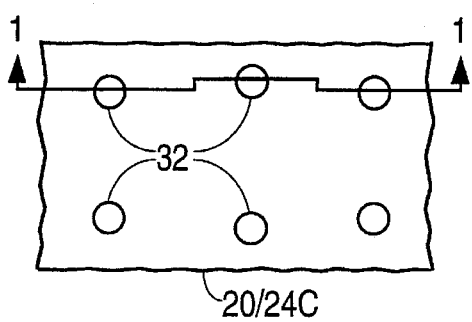

Next, part of the thickness of porous track layer 24A is uniformly removed along the top of layer 24A to produce the structure shown in FIGS. 1g and 2g. Item 24C is the remainder of porous track layer 24A. As illustrated in FIG. 1g, caps 32 are vertically separated from remaining track layer 24C.

The track-material removing step is performed with an etchant that does not significantly attack the filament or cap metal. Likewise, the etchant does not significantly attack substrate 20 or non-insulating region 22. The etching is conducted for a time sufficient to remove approximately 0.3 µm of the thickness of the track material.

Figure 1H:
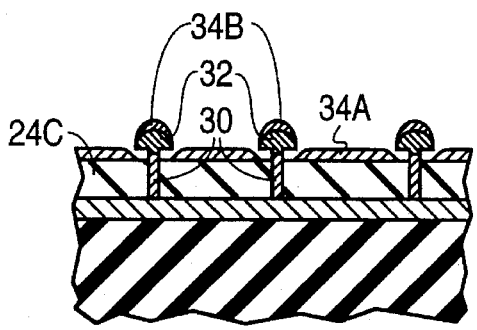
Figure 2H:
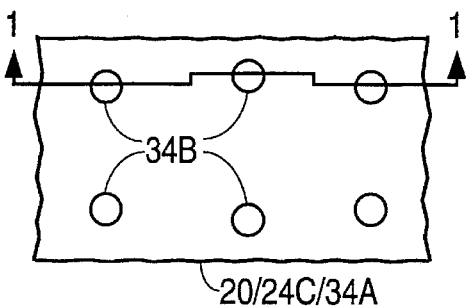

Electrically non-insulating gate material is now deposited on top of the structure to a thickness less than the removed thickness of the porous material. The gate-material thickness is typically 0.1 µm. The deposition is performed in a direction largely perpendicular to the lower surface of substrate 20 and thus in a direction generally perpendicular to the upper structural surface. As indicated in FIGS. 1h and 2h, a layer 34A of the gate material thereby accumulates on the portion of track layer 24C not shielded by caps 32. A layer 34B of the gate material likewise normally accumulates on each cap 32. Importantly, caps 32 prevent substantially any of the gate material from accumulating on the portions of track layer 24C below caps 32.

The criteria for selecting the gate material normally an electrical conductor, depends on the technique utilized below for removing caps 32. If the cap removal is done electrochemically, non-insulating layer 34A which later becomes the gate electrode can be electrically protected. As a result, the gate material can generally be any metal that is not highly reactive. Suitable candidates include molybdenum, copper, and aluminum.

If chemical or plasma etching is used for the cap removal, the gate material consists of a metal different from the cap metal. In particular, the cap metal must be selectively etchable with respect to the gate material. The gate material could also be conductively doped semiconductor material, provided that the selective etchability requirement is, as appropriate, met.

An evaporative deposition technique is typically used to form non-insulating layers 34A and 34B. The evaporative deposition is performed at low pressure in a suitable vacuum chamber. Layers 34A and 34B could also be formed by other direction-controllable physical deposition techniques such as sputtering.

Caps 32 are removed with an etchant that attacks the cap metal much more than the gate material or the filament metal at the upper ends of filaments 30. In so doing, non-insulating portions 34B are simultaneously removed. When regions 30, 32, and 34A respectively consist of platinum, silver, and molybdenum, the etching is typically performed by an electrochemical process in which non-insulating layer 34A is held at a different potential than caps 32. This is achieved by applying one potential to non-insulating layer 34A and another potential to lower non-insulating region 22. Alternatively, as mentioned above, caps 32 and overlying non-insulating portions 34B can be removed with a chemical or plasma etchant.

Figure 1I:
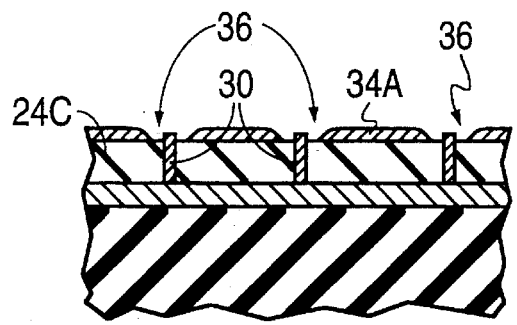
Figure 2I:
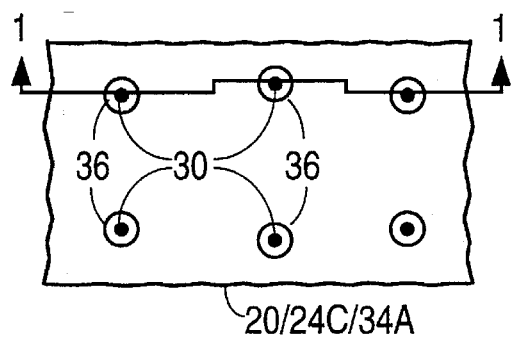

FIGS. 1i and 2i show the resultant structure in which the upper ends of filaments 30 are now exposed. Patterned upper non-insulating layer 34A now constitutes the gate electrode for the field-emission structure. Gate electrode 34A has gate openings 36 respectively centered on filaments 30. Due to the protection supplied by caps 32 during the gate-material deposition, each gate opening 36 is wider than corresponding filament 30. Consequently, gate electrode 34A is laterally separated from filaments 30.

The cathode/gate structure of FIGS. 1i and 2i can be utilized directly as a field emitter. Nonetheless, it is advantageous for filaments 30 to extend out of the track material and for the upper ends of filaments 30 to be sharpened.

To this end, portions of porous track layer 24C exposed through openings 36 are removed with an isotropic etchant to form cavities 38 respectively around filaments 30. See FIGS. 1j and 2j. The isotropic etchant used to create cavities 38 does not significantly attack any other portions of the structure. Filaments 30 now protrude outward beyond the remainder 24D of porous track 24C. Each cavity 38 is considerably wider—i.e., has a considerably greater maximum transverse cross-sectional area—than corresponding pore $28_1$.

Figure 1J:
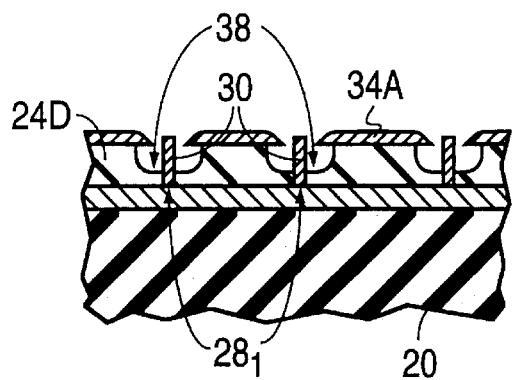
Figure 2J:
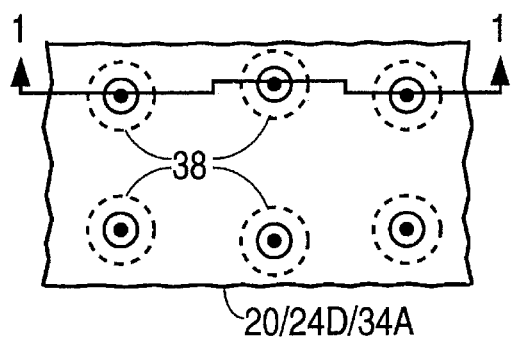

Cavities 38 typically extend partway down to lower non-insulating region 22. This situation is illustrated in FIG. 1j. However, cavities 38 can extend all the way down to region 22. In either case, by appropriately choosing the fabrication parameters, track layer 24D is sufficient for supporting gate layer 34A.

An electropolishing and etching operation is performed to tailor and sharpen the upper ends of filaments 30. The electropolishing, which is done first, rounds the upper ends of filaments 30 and reduces their length somewhat. The etch sharpens the rounded filament ends.

The electropolishing is performed in an electrolytic cell in which filaments 30 constitute the anode. After bringing the structure of FIGS. 1j and 2j into contact with the cell electrolyte, a suitable potential is applied between (a) filaments 30 by way of non-insulating region 22 and (b) a cathode plate, typically gate layer 34A, to cause current to flow between filaments 30 and the cathode plate. The electropolishing is typically conducted in an operational regime where the rate of metal removal increases with increasing electric field strength. Because the highest electric field, and thus the greatest material removal rate, for each filament 30 occurs at the outer top filament edge, the upper ends of filaments 30 become rounded.

By arranging the lower surface of substrate 20 to be approximately parallel to the cathode plate in the electrolytic cell, the upper ends of the longer ones of filaments 30 experience the highest electric fields. More material is thereby removed from the upper ends of the longer ones of filaments 30 than from the shorter ones during the electropolishing. Accordingly, the electropolishing also enables filaments 30 to become more uniform in length.

Figure 1K:
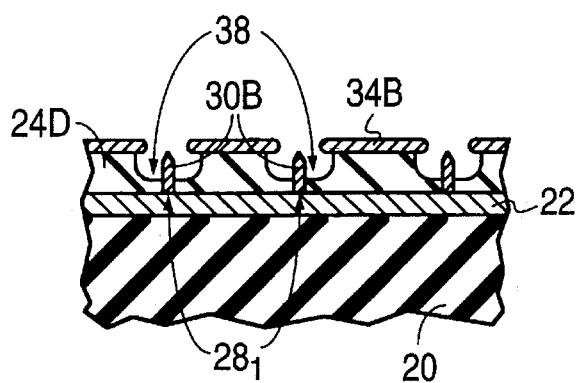
Figure 2K:
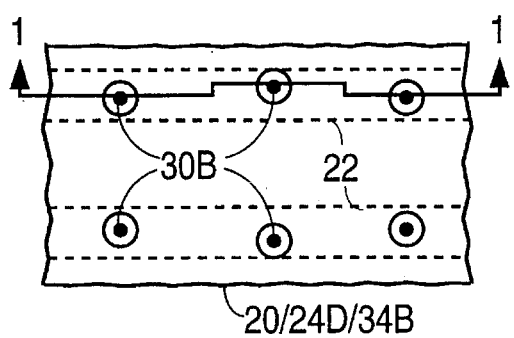
Figure 4A:
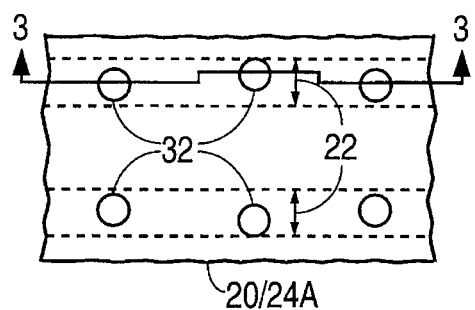
Figure 4B:

The filament etch is also typically done by bringing the field-emission structure into contact with the electrolyte of an electrolytic cell in which filaments 30 constitute the anode to which a driving voltage is applied via non-insulating region 22. The rate of metal removal varies with electric field strength and filament morphology in such a way that the rounded upper ends of filaments 30 become pointed. The etch can also be done according to a chemical technique. If the etch is done by a chemical technique rather than an electrochemical technique, undesired etching of gate layer 34A can be avoided by applying an appropriate voltage to layer 34A and/or making suitable materials selection. FIGS. 1k and 2k illustrate the final field emitter in which sharpened filaments 30B are the remainders of filaments 30.

An electropolishing step is also typically performed to round the edges of patterned gate layer 34A overlying cavities 38. Layer 34A acts as the anode during this step, while filaments 30B serve as the cathode via non-insulating region 22. Patterned gate layer 34B in FIGS. 1k and 2k is the edge-rounded remainder of gate layer 34A.

FIGS. 3a–3f (collectively "FIG. 3") and FIGS. 4a–4f (collectively "FIG. 4"), depict an alternative group of steps for providing the cathode structure of FIGS. 1f and 2f with a self-aligned gate structure. FIGS. 1f and 2f are repeated here as FIGS. 3a and 4a. In this alternative, the thickness of porous track layer 24A is typically 0.5 μm.

A blanket layer 40 of electrically non-insulating gate material is deposited on porous track layer 24A and caps 32 along the top of the structure. See FIGS. 3b and 4b. The thickness of layer 40 is typically 0.1 μm.

The gate material usually consists of an electrical conductor, preferably a metal selectively etchable with respect to the cap metal. Platinum can be utilized for the gate metal. As long as the selective etchability requirement is met, the gate material could consist of other metals or/and conductively doped semiconductor material. Various techniques can be employed for the gate-material deposition provided that the thickness of the portion of gate-material layer 40 above track layer 24A is relatively uniform.

Figure 3A:
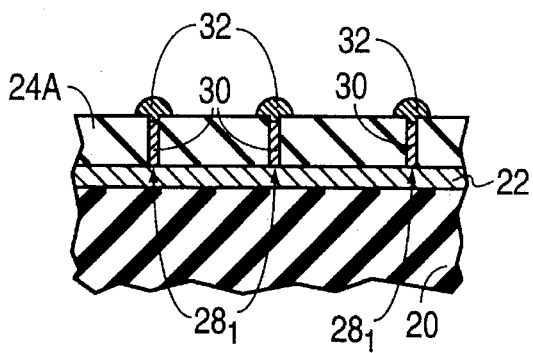
Figure 3B:
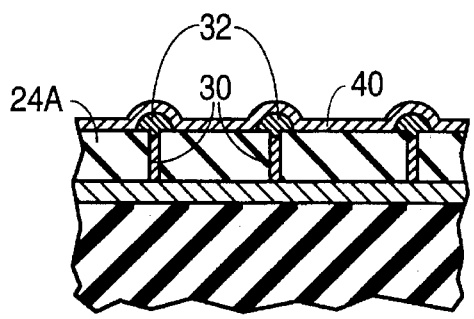
Figure 3C:
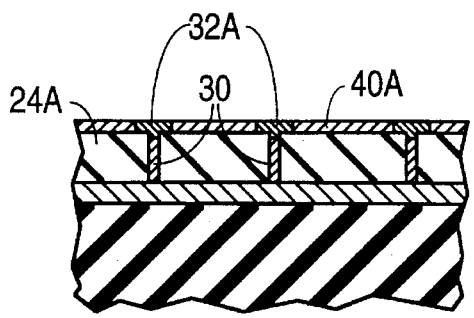
Figure 4C:
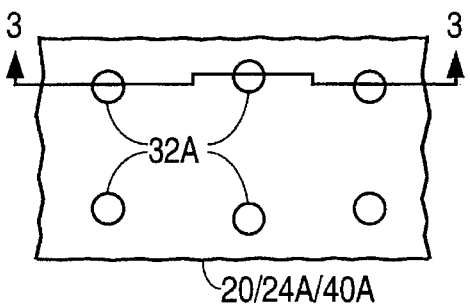

The portions of gate-material layer 40 overlying caps 32 are removed in a planarization operation by which the combination of caps 32 and layer 40 is provided with a largely flat upper surface. In so doing, small upper portions of caps 32 are also removed. FIGS. 3c and 4c depict the resulting structure in which items 32A are the remainders of caps 32. Item 40A is the remainder of gate-material layer 40.

The planarization operation is performed in several steps. Firstly, a flowable material such as photoresist is deposited on the top of the structure. Secondly, the flowable material is flowed so that its upper surface becomes largely planar. Thirdly, an etchback is performed with an etchant that attacks the flowable material and the gate material at approximately the same rate. The etchback is terminated when all of the flowable material has been removed. Because the etchant attacks the gate material at approximately the same rate as the flowable material, the upward-protruding portions of gate-material layer 40—i.e., the portions overlying caps 32—are simultaneously removed.

Caps 32A are removed with an etchant that does not significantly attack filaments 30 or non-insulating layer 40A. See FIGS. 3d and 4d. Layer 40A, which now constitutes the gate electrode for the structure, has gate openings 42 respectively centered on filaments 30. Because each cap 32 was wider than corresponding filament 30, gate layer 40A is laterally separated from filaments 30.

As with the cathode/gate structure of FIGS. 1i and 2i, the cathode/gate structure of FIGS. 3d and 4d can be employed directly as a field emitter. However, it is similarly advantageous to further process the structure of FIGS. 3d and 4d in the same manner as that of FIG. 1i and 2i. Accordingly, portions of porous track layer 24A exposed through openings 42 are removed with an isotropic etchant to form cavities 44 around filaments 30 as shown in FIGS. 3e and 4e. Filaments 30 protrude outward beyond the remainder 24E of porous track layer 24A. Each cavity 44 is considerably wider than corresponding pore $28_1$.

Cavities 44 typically extend partway down to non-insulating region 22. FIG. 3e illustrates this situation. As in the fabrication process of FIGS. 1 and 2, cavities 44 can also extend fully down to region 22.

An electropolishing and etching operation is performed to adjust and sharpen the upper ends of filaments 30. See FIGS. 3f and 4f. Items 30B again are the sharpened remainders of filaments 30. An additional electropolishing step is typically also done to round the edges of patterned gate layer 40A overlying cavities 44. Item 40B in FIGS. 3f and 4f is the edge-rounded remainder of gate layer 40A.

FIGS. 5a–5j (collectively "FIG. 5") and FIGS. 6a–6j (collectively "FIG. 6") illustrate a further process for manufacturing a gated field-emission structure using charged-particle tracks according to the invention. This field emitter is structurally similar to both that of FIGS. 1k and 2k and that of FIGS. 3f and 4f. Likewise, the field emitter fabricated according to the process of FIGS. 5 and 6 is typically used for exciting phosphors in a flat-panel CRT display.

Figure 6A:
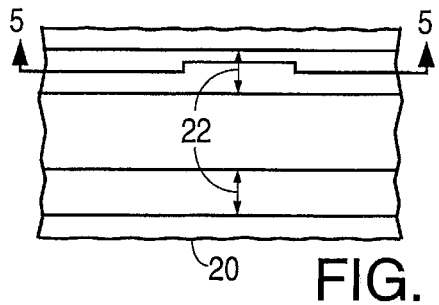
FIGS. 6a–6j are plan views respectively corresponding to FIGS. 5a–5j. The cross sections of FIGS. 5a–5j are taken through stepped plane 5—5 in FIGS. 6a–6j.
Figure 6B:
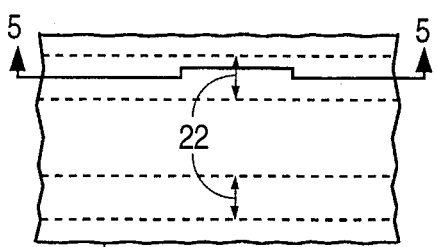

The starting point again is insulating substrate 20 over which non-insulating region 22 is provided. See FIGS. 5a and 6a. Substrate 20 and region 22 have the characteristics given above. In particular, region 22 typically contains a group of largely parallel lines, two of which are shown in FIG. 6a.

Insulating track layer 24 is again formed on top of the structure. See FIGS. 5b and 6b. Layer 24 likewise has the characteristics given above since charged-particle tracks are later formed through it.

At this point, the process of FIGS. 5 and 6 deviates from the earlier-described fabrication processes of the invention. A blanket electrically non-insulating layer 46, which later becomes the gate electrode, is formed on the top of insulating layer 24 as indicated in FIG. 5b. Non-insulating layer 46 is typically 0.05 μm in thickness. Layer 46 consists of a metal such as molybdenum, copper, or aluminum. Layer 46 could also be formed with conductively doped semiconductor material. The method for creating layer 46 is not particularly critical as long as its thickness is relatively uniform. Layer 46 is typically formed by a physical vapor deposition technique.

A further electrically insulating track (or track-recording) layer 48 is formed on the top of non-insulating layer 46. Again see FIG. 5b. Insulating track layer 48 is in the range of 0.2–0.5 μm in thickness. As with insulating layer 24, layer 48 consists of (a) an organic polymer such as polycarbonate, polystyrene, or cellulose acetate, (b) an inorganic glass such as phosphate, silicate, soda-lime, or spin-on glass, or (c) a crystal such as mica or quartz. Although there are some implementations in which layer 48 consists of the same insulator as layer 24, layer 48 is normally formed with an insulator that is selectively etchable with respect to layer 24.

Figure 5A:
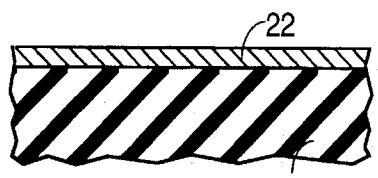
FIGS. 5a–5j are cross-sectional front views representing steps in fabricating a gated area field emitter according to the invention.
Figure 5B:
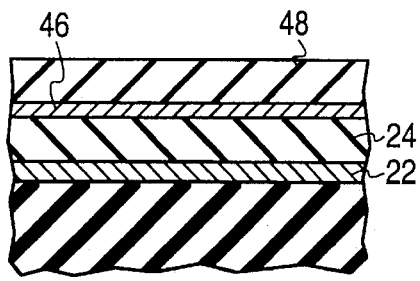
Figure 5C:
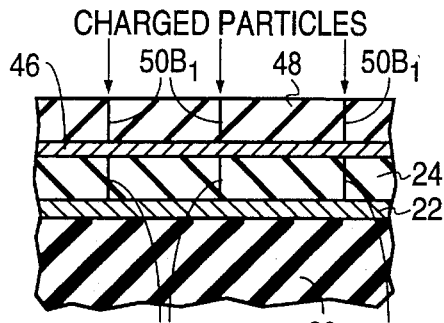
Figure 6C:
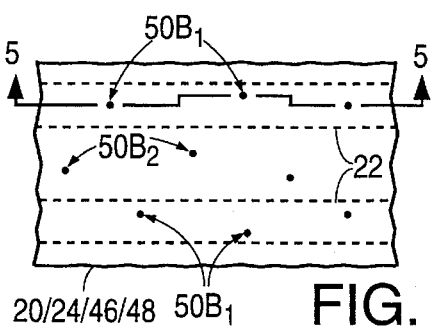

The structure is now subjected to energetic charged particles that impinge on the top of insulating track layer 48 in a direction largely perpendicular to the (unshown) flat lower surface of substrate 20 and thus in a direction generally perpendicular to the upper structural surface. The charged particles pass through layers 48, 46, and 24 and into the underlying material to form straight tracks through track layers 24 and 48 at random locations. FIGS. 5c and 6c illustrate the track formation. The charged-particle tracks again constitute damaged zones along the particle paths.

The charged-particle tracks are indicated by reference symbols beginning with "50" in FIGS. 5c and 6c. Each track is divided into (a) a "50A" segment extending through insulating layer 24 and (b) a "50B" segment extending through insulating layer 48 in a straight line with the 50A segment. Although the charged particles pass through non-insulating layer 46, they do not significantly damage layer 46 and therefore do not create charged-particle tracks through layer 46. The tracks fall into two categories: (a) segments $50A_1$ and $50B_1$ (collectively "$50_1$") extending respectively through portions of layers 24 and 48 overlying non-insulating region 22 and (b) segments $50A_2$ and $50B_2$ (collectively "$50_2$") extending respectively through portions of layers 24 and 48 not overlying region 22.

As with charged-particle tracks 26 in the previous fabrication processes of the invention, charged-particle tracks $50_1$ and $50_2$ (collectively "50") extend parallel to one another in a direction generally perpendicular to the upper structural surface. Tracks 50 have the same characteristics—e.g., size and spacing—as tracks 26. Tracks 50 are also formed in the same way as tracks 26. To simplify the illustration, only a small portion of tracks 50 are indicated in FIGS. 5c and 6c.

The damaged insulating material along track segments 50B in insulating track layer 48 is removed by bringing layer 48 into contact with a suitable chemical etchant that attacks the damaged 50B track material much more than the undamaged material of layer 48. As a result, generally circular pores are etched through layer 48 along segments 50B down to non-insulating layer 46. The etchant preferably does not significantly attack any of the other parts of the field-emission structure.

The etch is continued into the largely undamaged material of insulating track layer 48 to broaden the pores. Apertures $52_1$ and $52_2$ are thereby respectively created along track segments $50B_1$ and $50B_2$. See FIGS. 5d and 6d. Apertures $52_1$ and $52_2$ (collectively "52") expose corresponding portions of the upper surface of non-insulating layer 46. The etch is performed in a laterally uniform manner. Accordingly, each aperture 52 is centered on the location of corresponding track segment 50B. The thickness of layer 48 is also reduced during the etch.

The second part of the insulating-material etch can be done with the etchant used during the first part or with another etchant. In either case, components 20, 22, 24, and 46 are not significantly attacked during the second part of the etch. Apertures 52 thereby reach an average mean diameter of 15–300 nm, typically 140 nm, along the bottom of the reduced-thickness remainder 48A of insulating track layer 48. The aperture diameter is substantially the same for all of apertures 52.

Figure 5D:
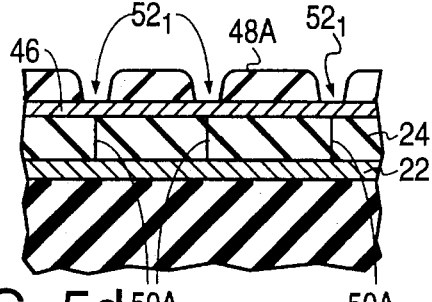
Figure 6D:
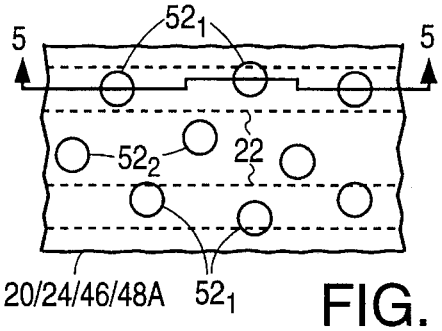

Apertures 52 are generally circular in shape as viewed from the top in the plan view of FIG. 6d. Apertures 52 are also usually somewhat wider at the top than at the bottom as indicated in FIG. 5d. The reason for slanting apertures 52 in this way is to facilitate subsequent reactive-ion etching of non-insulating layer 46. The aperture slope is obtained by using etchant whose selectivity—i.e., ratio of the rate at which the damaged track material is attacked to the rate at which the undamaged track material is attacked—is relatively low—e.g., 10 or less.

Apertures $52_2$, which are formed as a by-product of creating apertures $52_1$, do not serve any useful purpose in the emitter fabrication process. If desired, the formation of apertures $52_2$ and the additional (non-useful) features subsequently produced as a result of apertures $52_2$ can be suppressed. For example, during the etching of track layer 48, a suitable mask can be utilized to cover track segments $50B_2$.

Figure 5E:
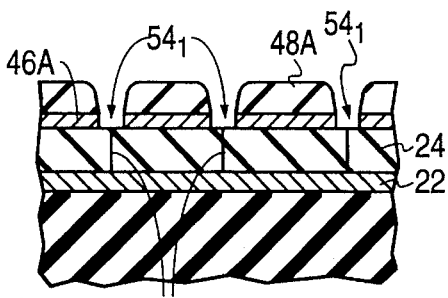
Figure 6E:
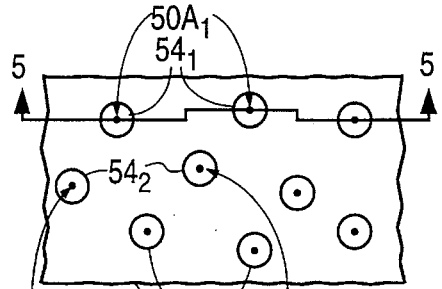

Using track layer 48A as an etch mask, the portions of non-insulating layer 46 exposed through apertures 52 are removed with an anisotropic etchant to create generally circular openings down to track layer 24. FIGS. 5e and 6e depict the consequent structure in which gate openings $54_1$ extend through the portions of layer 46 located above non-insulating region 22, while further gate openings $54_2$ extend through the portions of layer 46 not overlying region 22. The remainder 46A of layer 46 is the patterned gate electrode for the field emitter. The anisotropic etch is typically done according to a reactive-ion-etch technique.

The etchant utilized to create openings $54_1$ and $54_2$ (collectively "54") is controlled in such a way as to avoid significantly attacking other parts of the structure. Due to the anisotropic nature of the etch, each opening 54 is of largely the same transverse shape—i.e. generally circular—and of nearly the same diameter as corresponding aperture 52 (along the bottom of track layer 48a). Each opening 54 is vertically aligned with corresponding aperture 52. Since each aperture 52 is centered on the location of corresponding track segment 50B, each opening 54 is also centered on the location of corresponding segment 50B.

Track layer 48A is usually removed at some point subsequent to the creation of openings 54. As, for example, indicated in FIGS. 5f and 6f, layer 48A could be removed directly after openings 54 are formed.

Figure 5F:
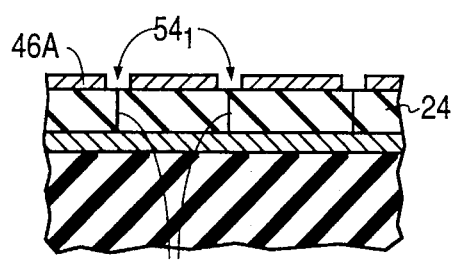
Figure 5G:
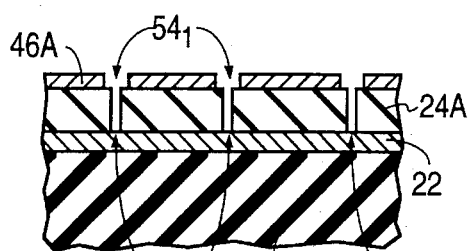

With portions of the upper surface of insulating track layer 24 now exposed at track segments 50A, the structure is brought into contact with a chemical etchant that attacks the damaged material along segments 50A much more than the undamaged material of layer 24. Pores 28₁ and 28₂ are thereby created through layer 24 respectively along track segments 50A₁ and 50A₂ as indicated in FIGS. 5g and 6g. Pores 28₁ and 28₂ (again collectively "28") have the same physical/spatial characteristics, described above, as pores 28 in the previous manufacturing processes of the invention. The etch utilized to create pores 28 here is typically performed in the same manner as described above in connection with the structure of FIGS. 1d and 2d. The remainder of layer 24 again is homogeneous porous insulating track layer 24A.

Importantly, each pore 28 in FIGS. 5g and 6g is considerably narrower than corresponding opening 54. For example, when the bottom diameter of one of apertures 52 is 140 nm so that corresponding opening 54 is 150 nm in diameter, corresponding pore 28 typically has a diameter of 50–100 nm. Each pore 28 is centered on the location of corresponding track segment 50A. Because (a) each track segment 50B was in a straight line with corresponding track segment 50A and (b) each opening 54 is centered on the location of corresponding track segment 50B, each opening 54 is centered on corresponding pore 28.

Figure 6F:
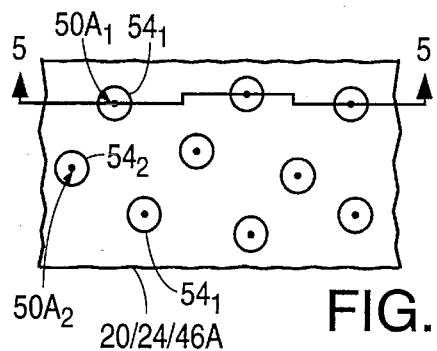
Figure 6G:
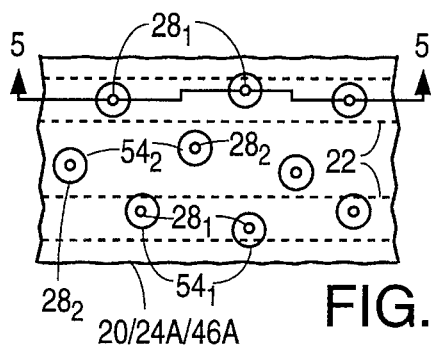
Figure 5H:
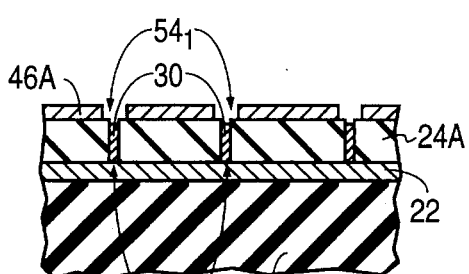
Figure 6H:
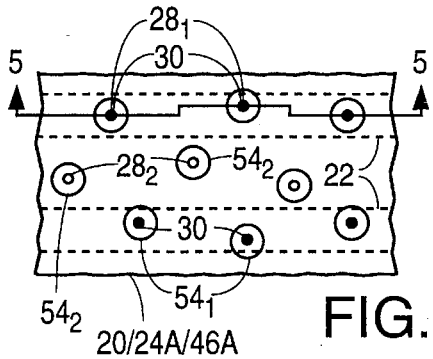

A suitable filament metal is now electrochemically deposited to form electron-emissive metal filaments 30 in pores 28₁ overlying lower non-insulating region 22 as indicated in FIGS. 5h and 6h. The deposition is performed in the manner prescribed above in connection with the structure of FIGS. 1e and 2e. Since there is no electrical contact at the bottoms of pores 28₂ located directly above substrate 20, substantially none of the filament metal accumulates in pores 28₂. In FIG. 6h, the dark circles indicate pores 28₁ filled with filaments 30, while the light circles indicate empty pores 28₂. Although there are openings 54 for all of pores 28, the electrochemical nature of the process enables the deposition to be selective.

Filaments 30 again have the characteristics described above. Since pores 28₁ are situated at random locations across porous layer 24, filaments 30 are again located in random places across layer 24. Due to the centering that results from the track formation and etching, filaments 30 are self-aligned to openings 541 and therefore to gate electrode 46A.

The cathode/gate structure of FIGS. 5h and 6h can be utilized directly as a field emitter. Nonetheless, it is again advantageous for filaments 30 to have sharpened tips that protrude out of the porous material. Accordingly, the structure of FIGS. 5h and 6h is further processed in the way described above for the other gated field emitters of the invention.

Figure 5I:
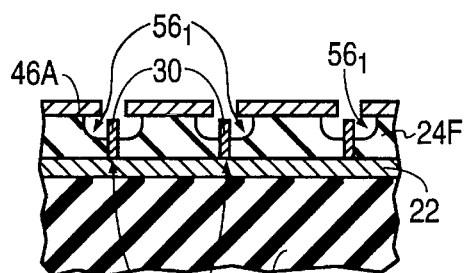
Figure 6I:
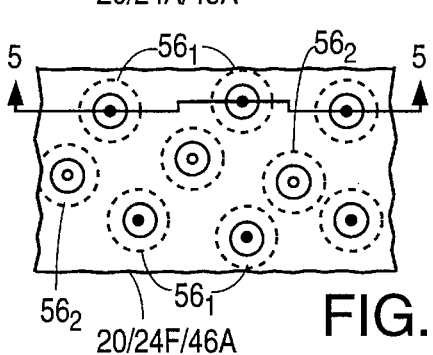

Portions of porous track layer 24A exposed through gate openings 54₁ are removed with an isotropic etchant to form cavities 56₁ around filaments 30 as indicated in FIGS. 5i and 6i. Because gate layer 46A also has openings 54₂, portions of layer 24A exposed through openings 54₂ are simultaneously removed to form cavities 56₂. Cavities 56₁ and 56₂ (collectively "56") can extend partway, or all the way, down to lower non-insulating region 22. FIG. 5i indicates the former case. In both cases, filaments 30 now protrude outward beyond the remainder 24F of porous track layer 24A.

Figure 5J:
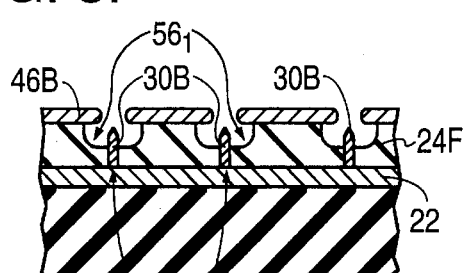
Figure 6J:
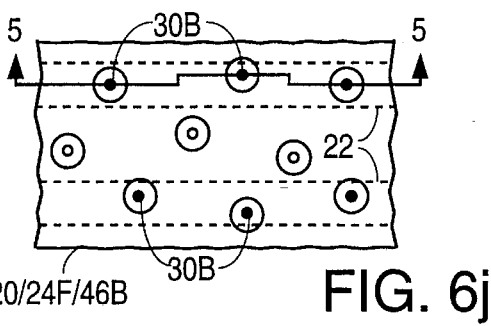

The upper ends of filaments 30 are sharpened by performing an electropolishing and etching operation. An electropolishing step to round the edges of patterned gate layer 46A overlying cavities 56₁ completes the basic fabrication of the field emitter. FIGS. 5j and 6j show the final structure in which items 30B are the sharpened remainders of filaments 30. Item 46B again is the edge-rounded remainder of gate layer 46A.

Because electron-emissive elements 30B are formed by a process that involves electrochemically filling pores 28₁ with metal and then (as desired) removing part of the metal to form sharpened tips, the upper ends of elements 30B are normally situated below the bottom of patterned gate layer 46A or 46B. In certain applications, it is desirable for the electron-emissive elements in a gated field emitter to extend upward beyond the bottom of the gate electrode and sometimes even beyond the top of the gate electrode. Turning to FIGS. 7a–7e (collectively "FIG. 7"), they illustrate a sequence of steps for converting filaments 30 in the structure of FIGS. 5i and 6i into pointed electron-emissive filaments that extend beyond the top of the gate electrode. FIG. 5i is repeated here as FIG. 7a.

Figure 7A:
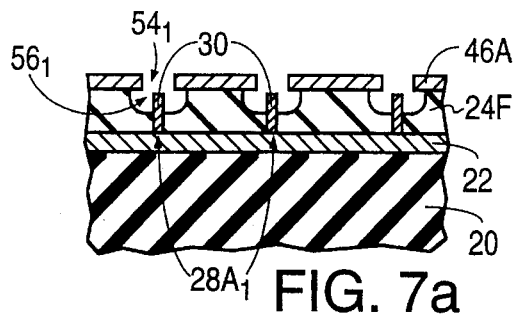
FIGS. 7a–7e are cross-sectional front views representing an alternative set of steps performable on the structure of FIGS. 5i and 6i for manufacturing a gated area field emitter according to the invention.
Figure 7B:
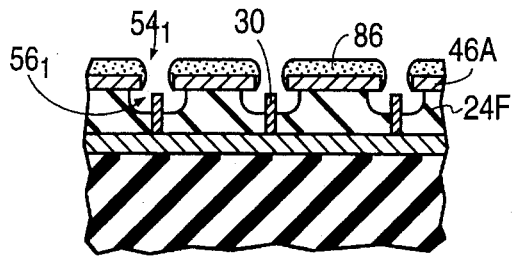

A thin masking layer 86 of a lift-off material is formed on the partially finished field-emission structure of FIG. 7a in such a way that the lift-off material fully covers gate layer 46A but does not cover the tops of filaments 30. See FIG. 7b. Preferably, none of the lift-off material is present in the portions of cavities 56₁ situated to the sides of filaments 30. The thickness of layer 86 is typically a fraction of (i.e., less than) the mean diameter of gate openings 54.

Lift-off layer 86 is typically created according to a physical deposition technique, such as evaporation, in which atoms of the lift-off material impinge, and thereby accumulate, on the top of gate layer 46A in a direction that is at a small angle to the (unshown) lower surface of substrate 20 and thus at a small angle to the top of gate layer 46A. To achieve a spatially uniform deposition, either the partially finished field emitter or the source of the lift-off material is rotated at a constant speed about an axis perpendicular to the lower surface of substrate 20. The impingement angle is set at a sufficiently small value as to enable some of the lift-off material to accumulate on the lateral edges of gate layer 46A along gate openings 54, but to substantially inhibit any of the lift-off material from passing through openings 54.

Figure 7C:
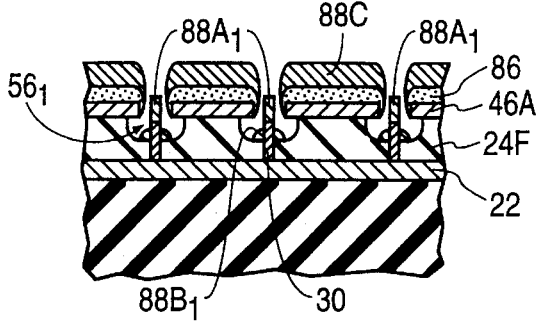

Next, blunted metallic tips 88A₁ are respectively formed on the upper surfaces of filaments 30 as depicted in FIG. 7c. Metal tips 88A₁ are preferably created according to a physical deposition technique, such as evaporation, in which atoms of the tip metal are directed toward the top of the field-emission structure in a direction largely perpendicular to the lower surface of substrate 20 and thus in a direction largely perpendicular to the top of gate layer 46A. As a result, atoms of the tip metal pass through gate openings 54₁ to form tips 88A₁.

During the tip deposition, annular portions 88B₁ of the tip metal respectively accumulate around filaments 30 at the bottoms of cavities 56₁. Atoms of the tip metal also pass through gate openings 54₂ (not shown) to form pieces (not shown) of the tip metal along parts of insulating layer 24F exposed through cavities 56₂ (also not shown). These pieces of the tip metal do not contact lower non-insulating region 22. Accordingly, they do not affect the electrical operation of the final field emitter.

A layer 88C of the tip metal accumulates on lift-off layer 86 during the tip deposition. As the thickness of layer 88C increases, layer 88C typically grows slightly in the lateral direction. Although this lateral growth gradually reduces the size of the openings through which the tip metal can deposit on filaments 30 and does affect the shape of metal portions 88B₁, the deposition of the tip metal is terminated before the tip-deposition openings through layer 88C become so small that the tip metal starts to accumulate non-uniformly (e.g., to start forming conically-ended tips) on the upper surfaces of filaments 30.

Figure 8A:
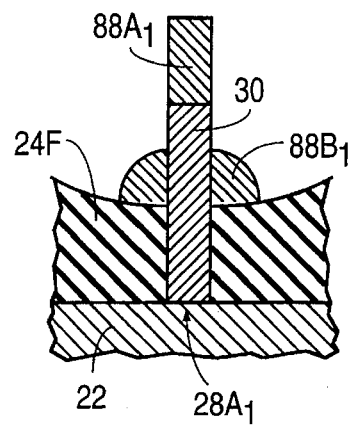
FIGS. 8a and 8b are respective expanded cross-sectional front views of one of the electron-emissive elements in FIGS. 7c and 7e.

The combination of each filament 30 and overlying tip 88A₁ forms a composite lengthened electron-emissive filament. FIG. 8a presents an enlarged view of one of lengthened filaments 30/88A₁ at the stage depicted in FIG. 7c. The presence of metal portion 88B₁ along the length of filament 30/88A₁ is normally not electrically significant.

A noble metal is preferably employed for the tip metal. In a typical implementation, the tip metal consists of platinum when components 22, 46A, and 30 are respectively formed with chromium, molybdenum, and platinum. In this case, each filament 30 and overlying tip 88A₁ consist of the same metal. Alternatively, the tip metal can be a non-noble metal, such as molybdenum or niobium, capable of being physically deposited in the way described above. The amount of tip metal deposited depends on the desired length (or height) of the final electron-emissive elements.

Lift-off layer 86 is now removed by subjecting the structure to a chemical etchant that attacks the lift-off material but does not significantly attack any other materials in the structure. During the removal of layer 86, layer 88C is lifted off to produce the structure shown in FIG. 7d.

Figure 7D:
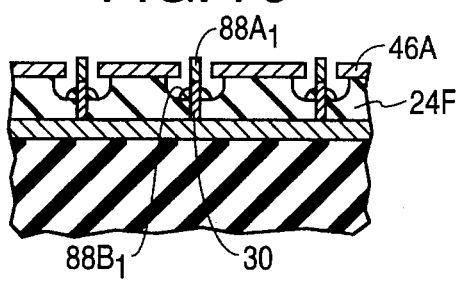
Figure 7E:
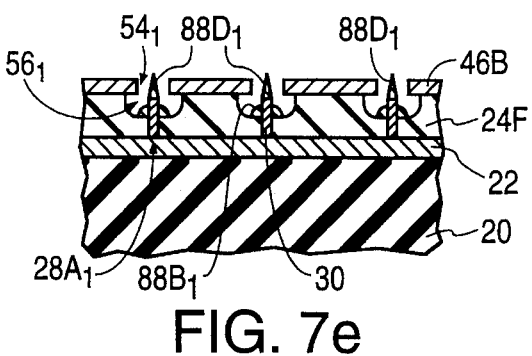
Figure 8B:
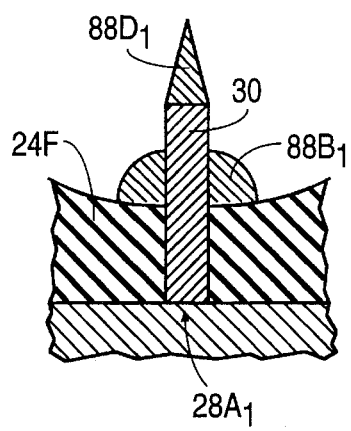

An electropolishing and etching operation is performed in the manner described above to tailor and sharpen the upper ends of filaments 30/88A₁. As in the fabrication process of FIGS. 1 and 2, the electropolishing step enables filaments 30/88A₁ to become more uniform in length. During the filament etch, the upper ends of filaments 30/88A₁ are sharpened. FIG. 7e illustrates the exemplary case in which substantially all the tailoring and sharpening is done on upper ends 88A₁ which thereby become pointed tips 88D₁. Each cavity 56₁ in combination with underlying pore 28A₁ now forms a dielectric open space for corresponding filament 30/88D₁. FIG. 8b presents an enlarged view of typical filament 30/88D₁ at the stage shown in FIG. 7e.

A further electropolishing step is normally also performed in the manner described above to round the edges of gate layer 46A overlying cavities 56₁. Patterned gate electrode 46B in FIG. 7e is the rounded-edge remainder of gate layer 46A.

The mean diameter of the base of each metal tip 88D₁ in FIG. 7e is the same as the mean diameter of underlying filament 30. Alternatively, filamentary electron-emissive elements with conical tips can be created in which the mean diameter at the base of each tip is considerably greater than the mean diameter of the underlying filament. FIGS. 9a–9h (collectively "FIG. 9") illustrate a sequence of fabrication steps by which the process of FIGS. 5 and 6 is modified starting at the stage shown in FIGS. 5f and 6f to create a gated field emitter having conically pointed filamentary electron-emissive elements whose tips are respectively wider at their bases than the underlying filamentary segments. FIG. 5f is repeated here as FIG. 9a.

Figure 9A:
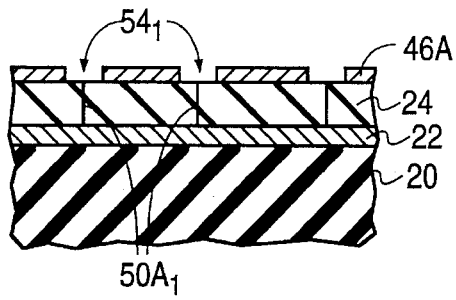
FIGS. 9a–9h are cross sectional front views representing an alternative set of steps performable on the structure of FIGS. 5f and 6f for manufacturing a gated area field emitter according to the invention.
Figure 9E:
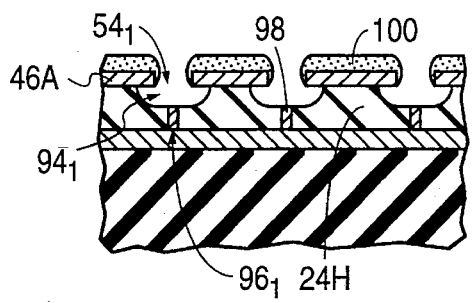
Figure 9B:
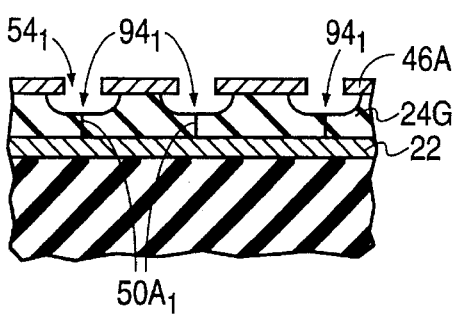

Portions of insulating track layer 24 exposed through gate openings 54₁ are removed with an isotropic chemical etchant to form cavities 94₁ that extend partway, but not all the way, through layer 24 as shown in FIG. 9b. Portions of layer 24 exposed through gate openings 54₂ (not shown) are simultaneously removed to form cavities 94₂ (likewise not shown) that extend partway through layer 24. Each of cavities 94₁ and 94₂ (collectively "94") extends slightly under gate layer 46A.

The etchant preferably attacks the damaged material along track segments 50A at approximately the same rate as the undamaged insulating material of track layer 24. Consequently, the portion of each track segment 50A, of which only segments 50A₁ are shown in FIG. 9b, at the bottom of corresponding cavity 94 is not significantly attacked during the etch. The remainder of insulating track layer 24 is indicated as item 24G in FIG. 9b.

The structure is now brought into contact with a chemical etchant that attacks the damaged 50A track material much more than the undamaged material of insulating track layer 24G. Pores 96₁ are thereby created through layer 24G along the remaining portions of track segments 50A₁ at the bottom of cavities 94₁ as shown in FIG. 9c. Pores 96₂ (not shown) are simultaneously etched through layer 24G along the remaining (unshown) portions of track segments 50A₂ at the bottom of cavities 94₂ (also not shown). Item 24H in FIG. 9c is the remainder of insulating track layer 24G.

The etch utilized to form pores 96₁ and 96₂ (collectively "96") is performed uniformly in largely the same manner as that employed to create pores 28. Each pore 96 is thereby centered on the location of corresponding track segment 50A. Pores 96 typically have the same physical/spatial characteristics as given above for pores 28. In addition to being narrower than overlying cavity 94, each pore 96 is considerably narrower than corresponding gate opening 54. Because (a) each track segment 50B was in a straight line with corresponding track segment 50A and (b) each gate opening 54 is centered on the location of corresponding track segment 50B, each opening 54 is centered on corresponding pore 96.

Figure 9F:
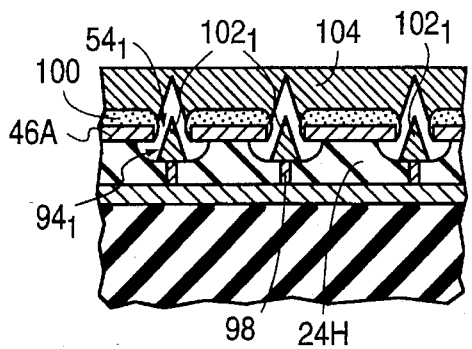
Figure 9C:
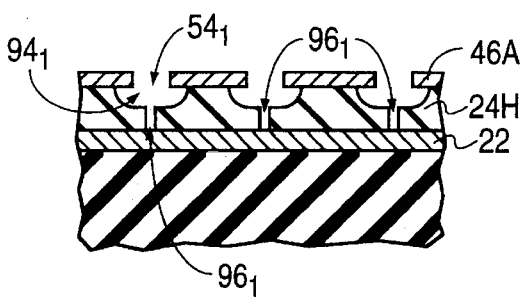
Figure 9G:
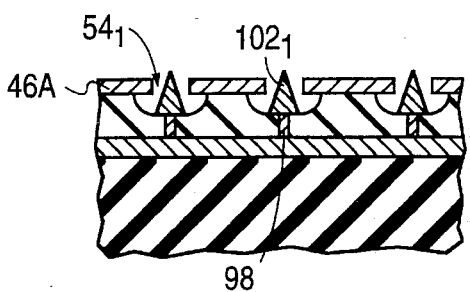
Figure 9D:
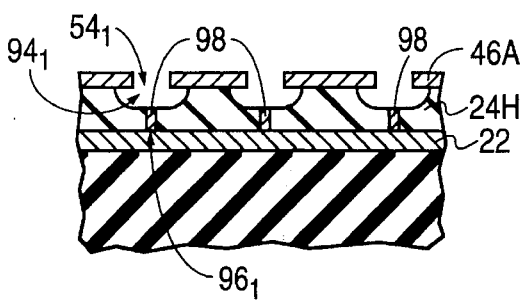

An appropriate filament metal is electrochemically deposited to create metal filaments 98 that substantially fill pores 96₁ over non-insulating region 22 as shown in FIG. 9d. The filament deposition is performed in the manner used to create filaments 30 in the process of FIGS. 5 and 6. Since there is no electrical contact at the bottoms of pores 96₂ located directly above substrate 20, substantially none of the filament material accumulates in pores 96₂. Consequently, the electrochemical nature of the process enables the deposition to be selective even through there is a gate opening for each pore 96.

Filaments 98 can be formed with a noble metal such as platinum, gold, or palladium. The filament metal can also be a non-noble metal such as nickel, copper, cobalt, molybdenum, or niobium.

Metal filaments 98 have the same basic length, diameter, length-to-diameter, and cross-sectional characteristics as filaments 30. In particular, the length-to-maximum-diameter ratio for filaments 98 is preferably 5 or more. Although a comparison of FIG. 9d to FIG. 5i might seem to indicate that filaments 98 are shorter than filaments 30, filaments 98 can be made longer than filaments 30 by increasing the thickness of track layer 24 and appropriately controlling the depth of the cavity etch. As with filaments 30, the centering that results from the track formation and etching enables filaments 98 to be self-aligned to gate openings 54₁ and thus to gate layer 46A.

A thin masking layer 100 of a lift-off material is formed on the field-emission structure in such a manner that the lift-off material fully covers gate layer 46A but does not cover the tops of filaments 98. See FIG. 9e. Lift-off layer 100 is preferably created according to the technique used to create lift-off layer 86 in the fabrication process of FIG. 7.

A tip metal is introduced through gate openings 54₁ into cavities 94₁ to form pointed, generally conical metallic tips 102₁ that respectively contact filaments 98 as indicated in FIG. 9f. The tip metal is normally the same as in the process of FIG. 7.

The mean base diameter of each metallic tip $102_1$ is normally greater than the diameter of underlying filament 98. Consequently, tips $102_1$ extend laterally over adjoining portions of track layer 24H. The mean base diameter of each tip $102_1$, can be as large as, or slightly larger than, the mean diameter of corresponding gate opening $54_1$. Each filament 98 and overlying tip $102_1$ form a composite electron-emissive element whose maximum diameter occurs at a point between—i.e., spaced apart from—the ends of that element.

Metal tips $102_1$ are typically created according to a double-source physical deposition technique in which (a) atoms of a tip metal deposit on top of the structure in a direction largely perpendicular to the (unshown) lower surface of substrate 20 and thus in a direction largely perpendicular to the upper surface of gate layer 46A and (b) atoms of a closure material simultaneously impinge, and thereby accumulate, on the upper surface of layer 46A in a direction that is at a small angle to the lower surface of the substrate 20 while either the partially finished field emitter or the sources of the tip and closure materials are rotated at constant speed about an axis perpendicular to the lower surface of substrate 20 in order to obtain a spatially uniform deposition. Both parts of the deposition are usually done by evaporation.

The impingement angle for the closure material, which helps close the openings through which the tip metal enters cavities 94, is sufficiently small that substantially none of the closure material passes through gate openings $54_1$ to accumulate on filaments 98 or on portions of track layer 24H exposed through cavities $94_1$. Only the tip metal passes through openings $54_1$. The tip metal also passes through gate openings $54_2$ (not shown) to form pieces (not shown) of the tip metal along parts of layer 24H exposed through cavities $94_2$ (also not shown). These pieces of the tip metal are electrically inconsequential since they do not contact lower non-insulating region 22.

A composite layer 104 of the tip and closure materials accumulates on lift-off layer 100 during the tip deposition. Because the impingement angle for the closure material is less than 90°, composite layer 104 expands laterally as its thickness increases so as to progressively close the openings through which the tip metal can accumulate to form tips $102_1$. The deposition is conducted for a time sufficiently long that the tip-deposition openings through layer 104 close fully, and layer 104 becomes a continuous film. Tips $102_1$ are thus formed in the shape of cones respectively centered on filaments 98. Accordingly, tips $102_1$ are self-aligned to gate openings $54_1$. Each filament 98 and overlying metal cone $102_1$ form a composite electron-emissive element.

Lift-off layer 100 and composite layer 104 are removed in a conventional manner. FIG. 9g illustrates the resulting structure.

Figure 9H:
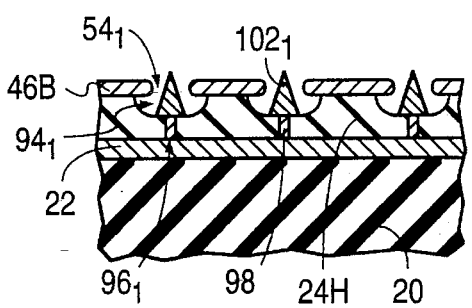

The final step in the fabrication process is to round the edges of gate layer 46A overlying cavities $94_1$ as shown in FIG. 9h. The edge rounding is preferably done by an electropolishing step in the way described above. Again, item 46B in FIG. 9h is the rounded-edge remainder of gate layer 46A. Each cavity $94_1$ and underlying pore $96_1$ form a dielectric open space for corresponding electron-emissive element $98/102_1$. Since pores $96_1$ are distributed randomly across track layer 24H, electron-emissive elements $98/102_1$ are situated at random locations above non-insulating region 22.

The metal portions that connect lower non-insulating region 22 to conical tips $88D_1$ and $102_1$ in the structures produced according to the fabrication processes of FIGS. 7 and 9 have been described as filaments. However, these metal portions could simply be metallic pedestals that do not necessarily have the elongated characteristics of filaments, such as the filamentary characteristics described above for filaments 30 in the process of FIGS. 5 and 6. For example, the length (or height) of a pedestal could be less than its diameter. In manufacturing a gated field emitter according to the process of FIGS. 5 and 6 as modified in accordance with the steps of FIG. 7 or 9, each reference to a filament can be broadened to a pedestal.

The process of FIGS. 5 and 6 can be modified to create a gated field-emission structure in which the electron-emissive elements consist solely of cones. That is, no filaments or pedestals lie between lower non-insulating region 22 and the cones. FIGS. 10a–10e (collectively "FIG. 10") and FIGS. 11a–11e (collectively "FIG. 11") illustrate a sequence of steps for creating such a cone-based gated field emitter from the structure depicted in FIGS. 5f and 6f. These two figures are respectively repeated here as FIGS. 10a and 11a.

Figure 10A:
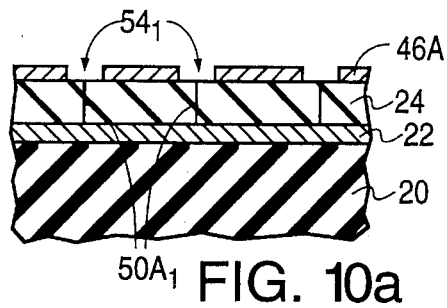
FIGS. 10a–10e are cross-sectional front views representing a further set of steps performable on the structure of FIGS. 5f and 6f for manufacturing a gated area field emitter according to the invention.
Figure 10B:
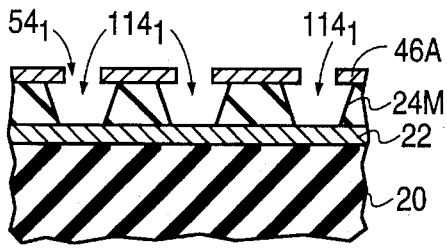
Figure 11A:
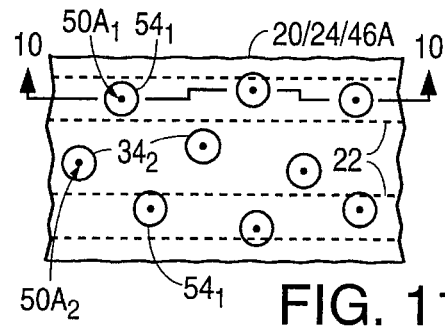
FIGS. 11a–11e are plan views respectively corresponding to FIGS. 10a–10e. The cross sections of FIGS. 10a–10e are taken through plane 10—10 in FIGS. 11a–11e.
Figure 11B:
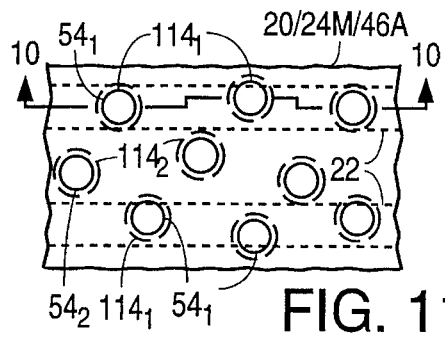

Using gate layer 46A as an etch mask, dielectric open spaces $114_1$ are etched through insulating track layer 24 down to lower non-insulating region 22 at the locations of gate openings $54_1$. See FIGS. 10b and 11b. Dielectric open spaces $114_2$ are similarly formed through layer 24 at the locations of gate openings $54_2$. Each of dielectric open spaces $114_1$ and $114_2$ (collectively "114") extends slightly under gate layer 46A. Item 24M in FIG. 10b is the remainder of track layer 24.

Figure 10C:
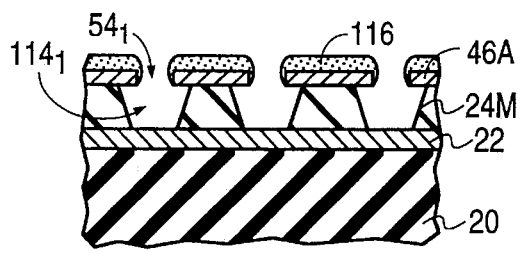
Figure 10D:
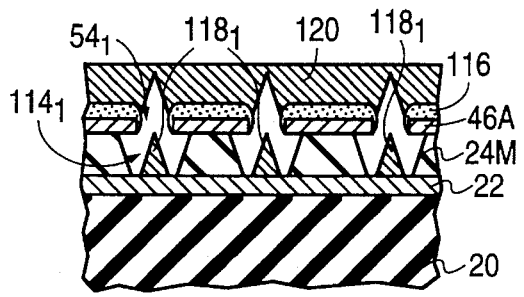
Figure 11C:
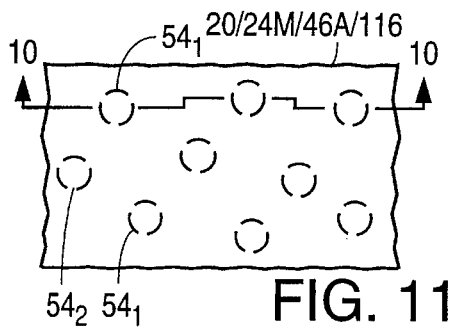
Figure 11D:
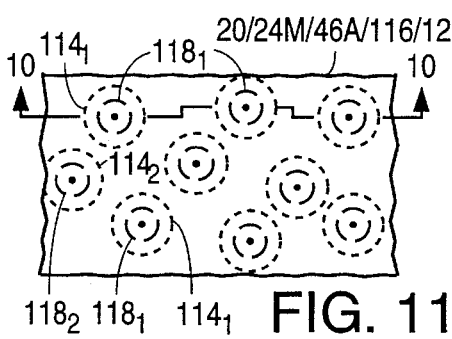

A thin masking layer 116 of a lift-off material is created on the structure so as to fully cover gate layer 46A as shown in FIGS. 10c and 11c. Lift-off layer 116 extends slightly over the edges of gate layer 46A along openings 54. Layer 116 is preferably created according to the technique employed to form lift-off layer 86 in the fabrication process of FIG. 7.

A cone metal is introduced through gate openings $54_1$ into cavities $114_1$ to form generally conical electron-emissive elements $118_1$ on non-insulating region 22. See FIGS. 10d and 11d. Electron-emissive cones $118_1$ are preferably formed according to the double-source physical deposition technique used to create filament tips $102_1$ in the process of FIG. 7. The tip metal in the process of FIG. 7 is now the cone metal. Some of the cone metal also passes through gate openings $54_2$ to form metal portions $118_2$ in cavities $114_2$. Metal portions $118_2$ do not contact lower non-insulating region 22 and therefore do not affect the electrical operation of the final field emitter.

During the cone deposition, a composite layer 120 of the cone and closure materials accumulates on lift-off layer 116 in the same manner that composite layer 104 is formed in the fabrication process of FIG. 9. The cone-deposition openings through which the cone metal enters cavities 114 close in a substantially uniform manner. As a result, tips $118_1$ are formed in the shape of electron-emissive cones self-aligned to gate openings $54_1$. The mean base diameter of each cone $118_1$ is the same as, or slightly larger than, the mean diameter of corresponding gate opening $54_1$.

Figure 10E:
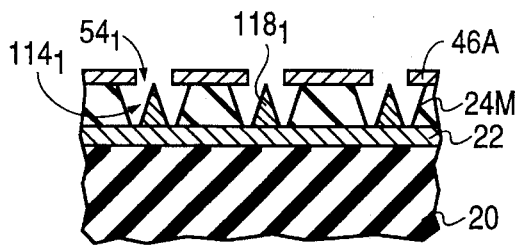
Figure 11E:
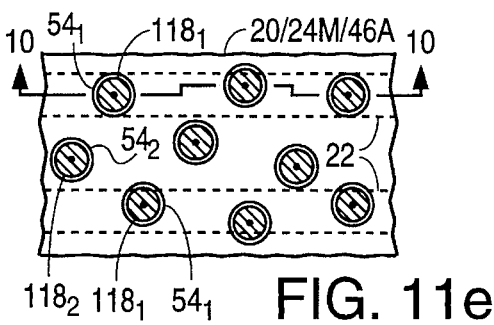
Figure 20A:
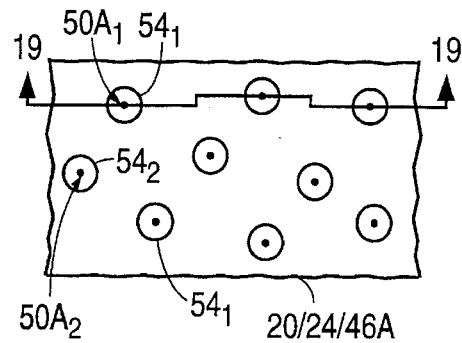
FIGS. 20a–20d are plan views respectively corresponding to FIGS. 19a–19d. The cross sections of FIGS. 19a–19d are taken through stepped plane 19—19 in FIGS. 20a–20d.

Layers 116 and 120 are removed in a conventional manner. FIGS. 10e and 11e depict the resulting structure. Because openings $54_1$ are situated at random locations across gate layer 46A, electron-emissive cones $118_1$ are located in random places above non-insulating region 22. An electropolishing step may be performed in the manner described above to round the edges of the remainder 46A of gate layer 46.

Various modifications involving the lift-off layers can be made to the processes of FIGS. 7–11. Instead of creating a lift-off layer by an angled deposition on top of gate layer 46A after cavities 56, 94, or 114 have been formed in insulating track layer 24, the lift-off layer can be provided at an earlier stage in the process. For example, the lift-off layer can be deposited on gate layer 46 at the beginning of the process before the deposition of further layer 48 in FIG. 5b. With the lift-off layer now situated between layers 46 and 48, the lift-off layer undergoes the same operations that track layer 48 undergoes except that the lift-off layer is not removed when the etched remainder 48A of layer 48 is removed. In fact, the lift-off layer could even consist of layer 48A.

FIGS. 12 and 13 illustrate the starting point for manufacturing implementations of the present field emitter in which lower non-insulating region 22 consists of an electrically conductive layer 22A situated under an electrically resistive layer 22B. As shown in FIG. 13, each of the lines that form region 22 consists of segments of both of layers 22A and 22B. Conductive layer 22A consists of one or more of the electrically conductive materials described above for layer 22. Resistive layer 22B is typically formed with cermet or lightly doped polycrystalline silicon.

FIGS. 14.1–14.4 respectively depict how the final structures of FIGS. 5j, 7e, 9h, and 10e appear when lower non-insulating region 22 consists of conductive layer 22A and resistive layer 22B. The lower ends of electron-emissive elements 30B, 30/88D$_1$, 98/102$_1$, or 118$_1$ contact resistive layer 22B. The resistance between each electron-emissive element and layer 22A is at least $10^6$ ohms, typically $10^8$ ohms or more.

In certain applications, it is desirable that each electron-emissive element contain an electrically resistive portion for improving emission uniformity and limiting emitter currents to prevent short-circuit and arcing failures. The resistive portion, preferably contacts lower non-insulating region 22. The resistance for the resistive portion is normally at least $10^6$ ohms, preferably $10^8$ ohms or more. More specifically, the resistance for the resistive portion is at least $10^{10}$ ohms. The resistive portions typically consist of cermet or lightly doped polycrystalline silicon.

FIG. 15.1 illustrates an example in which each electron-emissive filament 30B in FIG. 1k, 3f, or 5j consists of a lower electrically resistive portion 30C and an upper electrically conductive electron-emissive pointed tip 30D. FIG. 15.2 illustrates an example in which each electron-emissive cone 118$_1$ in FIG. 10e consists of a lower electrically resistive portion 118A$_1$ and an upper electrically conductive electron-emissive portion 118B$_1$. To provide the electron-emissive elements with resistive portions 30C or 118A$_1$, an initial part of the emitter deposition is performed with an electrically resistive material rather than the material(s) specified above. For filaments 30 in FIG. 1, 3, or 5, either all or a lower part of each filament 30 is formed with electrically resistive material. The same applies to filaments 98 in FIG. 9.

The electron-emissive cones in the field emitters of the invention have, for simplicity, been illustrated in the drawings as being of right circular shape (i.e., a right triangle rotated about one of its legs). However, the cones invariably have surfaces that differ somewhat from a right circular shape. For example, the surfaces of the cones typically bend inward slightly as shown in FIG. 16.1 for cones 102$_1$ of FIG. 9h and as depicted in FIG. 16.2 for cones 118$_1$ of FIG. 10e.

FIGS. 17.1–17.4 illustrate several longitudinal shapes that filaments 30B can have in the final field emitters of FIG. 1k, 3f, and 5j. As indicated in FIGS. 17.1 and 17.2, filaments 30B can be solid cylinders except at their upper ends. If tracks 50 are etched in such a manner as to create pores 28 as inverted cones, filaments 30B can be inverted solid cones which taper down in transverse cross section from just below their upper ends to their lower ends in the manner shown in FIGS. 17.3 and 17.4. Depending on how the electropolishing and etching operation is done, the electron-emissive tips at the upper ends of filaments 30B can be generally rounded as indicated in FIGS. 17.1 and 17.3 or sharply pointed as indicated in FIGS. 17.2 and 17.4.

FIG. 18 depicts the electrochemical deposition system employed during the electrochemical filament deposition operations described above. The electrochemical system consists of an electrochemical cell 72 and a power supply and control system 74. In turn, electrochemical cell 72 consists of cell electrolyte 76, a surrounding sidewall 78, an O-ring 80, an anode 82, and a cathode 84 formed by part of the structure on which metal is being deposited. Cathode 84 includes lower non-insulating region 22 to which power supply and control system 74 is connected. FIG. 18 specifically illustrates the filament deposition in the process of FIGS. 1, 3, and 5.

The electrochemical system shown in FIG. 18 operates according to a constant-current technique. Alternatively, a constant-voltage electrochemical deposition system could be used.

In the field emitters described above, each gate opening exposes only one electron-emissive element. Alternatively, charged-particle tracks can be utilized in accordance with the invention to fabricate gated area field emitters in which the gate electrode has gate openings respectively centered on the charged-particle tracks and in which each gate opening exposes multiple electron-emissive elements generally centered as a group on the gate opening.

FIGS. 19a–19d (collectively "FIG. 19") and FIGS. 20a–20d (collectively "FIG. 20") illustrate a sequence of additional processing steps that can be applied to the intermediate structure of FIGS. 5f and 6f to produce such a gated area field emitter in which each gate opening 54$_1$ accommodates a group of electron-emissive elements. FIGS. 5f and 6f are respectively repeated here as FIGS. 19a and 20a.

Inasmuch as each gate opening 54$_1$ exposes multiple electron-emissive elements in the process of FIGS. 19 and 20, gate openings 54$_1$ are usually wider here than in the earlier fabrication processes described above. In particular, the average mean diameter of openings 54$_1$ in FIGS. 19a and 20a is 0.5–5 µm, typically 1 µm. In comparison to using a photolithographic etching technique to form openings 54$_1$, the use of the present charged-particle track technique is particularly advantageous when the mean opening diameter is 1 µm or less. The average density of openings 54$_1$ is $10^6$–$10^8$ openings/cm$^2$, typically $10^7$ openings/cm$^2$.

Figure 19A:
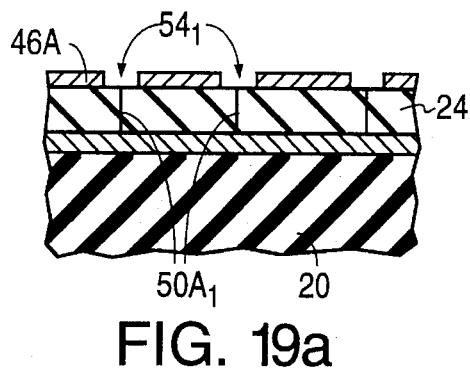
FIGS. 19a–19d are cross-sectional front views representing another set of steps performable on the structure of FIGS. 5f and 6f for manufacturing a gated area field emitter according to the invention.
Figure 19B:
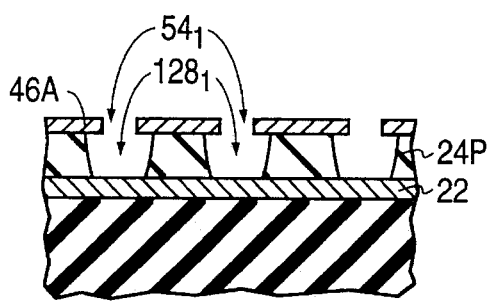
Figure 20B:
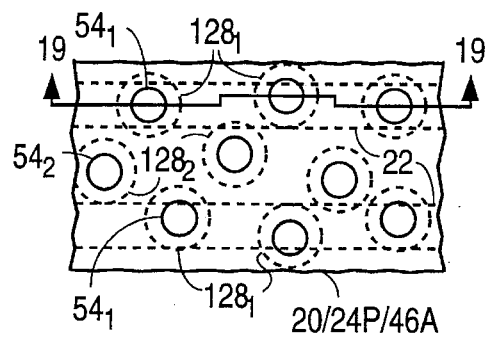
Figure 20C:
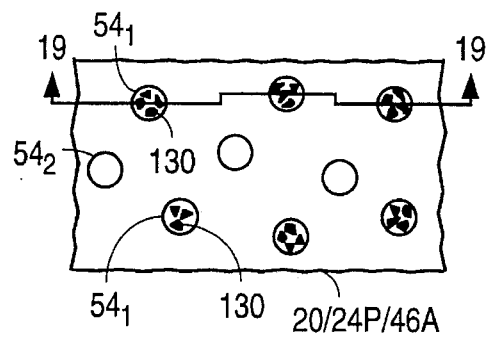

Using non-insulating layer 46A as a mask, insulating track layer 24 is etched through gate openings 54$_1$ to create corresponding dielectric open spaces 128$_1$ down to lower non-insulating region 22 as shown in FIGS. 19b and 20b. If gate openings 54$_2$ are present in layer 46A, the etchant also attacks portions of layer 24 exposed through openings 54$_2$ to create corresponding dielectric open spaces 128$_2$, indicated only in FIG. 20b, down to, and possibly partly into, insulating substrate 20. The etch is normally performed in such a way that dielectric open spaces 128$_1$ and 128$_2$ (collectively "128") extend laterally under layer 46A in a generally uniform manner as indicated in FIG. 19b. However, the etch could be performed so that the sidewalls of open spaces 128 respectively line up with the edges of gate openings 54. In either case, each dielectric open space 128 is centered on overlying gate opening 54. Item 24P in FIGS. 19*b* and 20*b* is the remainder of track layer 24.

A group of preformed particles 130 are introduced into each dielectric open space 128₁ and then distributed in a relatively uniform manner across the portion of the upper surface of lower non-insulating region 22 at the bottom of open space 128₁. See FIGS. 19*c* and 20*c*. The distributing step is performed in such a way that particles 130 are laterally separated from one another and are securely fixed to, and electrically coupled to, non-insulating region 22.

The distributing step typically involves dispersing particles 130 across the bottom of open spaces 128₁ in a random manner and then performing an operation to bond particles 130 to non-insulating region 22. Electrically non-insulating particle bonding material (not shown) holds particles 130 in place. To the extent that particles 130 do not actually touch region 22, the bonding material electrically connects particles 130 to region 22. The average mean diameter of particles 130 is 5 nm–1 µm, typically 100 nm.

Particles 130 preferably are electron emissive prior to being introduced into dielectric open spaces 128₁. However, particles 130 could be introduced into open spaces 128₁ in a non-emissive state and then be made electron emissive during or after the bonding operation. In either case, particles 130 serve as electron-emissive elements.

In one embodiment, the dispersion of particles 130 across the exposed upper surface portions of non-insulating region 22 and the subsequent bonding of particles 130 to region 22 is performed in the manner described in Twichell et al, co-filed U.S. patent application Ser. No. 269,283, "Structure and Fabrication of Electron-emitting Devices Utilizing Electron-emissive Particles which Typically Contain Carbon," filed 29 Jun. 1984. Particles 130 then typically consist of at least 50 atomic percent carbon in the form of electrically non-insulating diamond, graphite, amorphous carbon, or/and electrically non-insulating silicon carbide.

During the introduction of particles 130 into open spaces 128₁, some preformed particles (not shown) may be introduced into dielectric open spaces 128₂. Should this happen, there will be no significant deleterious effect on device operation because any electron-emissive particles at the bottoms of openings 128₂ contact insulating material of substrate 20.

Figure 19C:
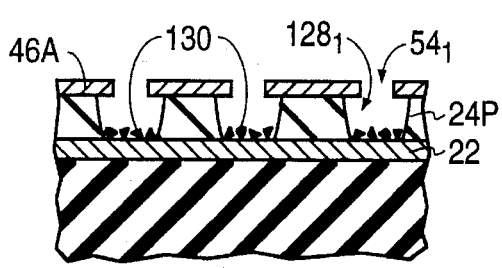
Figure 19D:
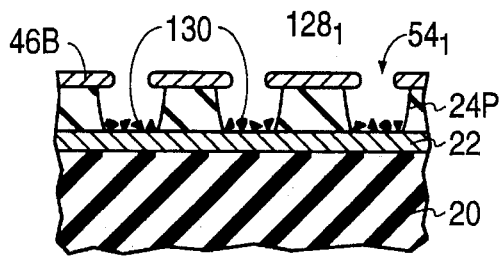
Figure 20D:
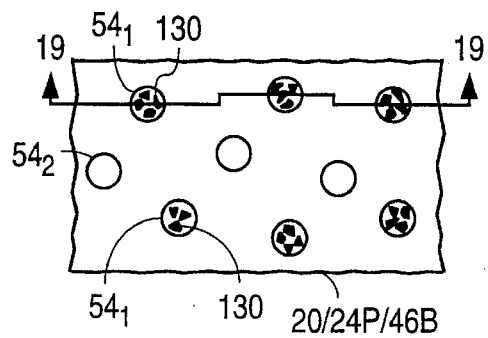

An electropolishing step can be performed to round the edges of patterned gate layer 46A. The final gated field-emitting device is shown in FIGS. 19*d* and 20*d*. Item 46B again indicates the edge-rounded remainder of gate layer 46A. Since dielectric open spaces 128₁ are respectively centered on gate openings 54₁, electron-emissive particles 130 in each open space 128₁ are, as a group, centered on overlying gate opening 54₁.

Particles 130 could be formed with materials other than carbon. For example, molybdenum or/and doped silicon carbide could be used. Instead of being dispersed across non-insulating region 22 in a preformed state, particles 130 could be grown over region 22.

Figure 21A:
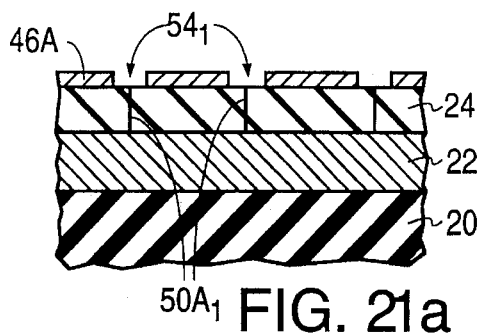
FIGS. 21a–21e are cross-sectional front views representing yet another set of steps performable on the structure of FIGS. 5f and 6f for manufacturing a gated field emitter according to the invention.

FIGS. 21*a*–21*e* (collectively "FIG. 21") illustrate another processing sequence that can be applied to the intermediate structure of FIGS. 5*f* and 6*f* to produce a gated field emitter in which each gate opening 54₁ accommodates multiple electron-emissive elements. FIG. 5*f* is repeated here as FIG. 21*a* except that non-insulating region 22 is thicker. In particular, the thickness of region 22 in the structure of FIG. 21*a* is 0.1–2 µm, typically 0.5 µm, greater than in the structure of FIG. 5*f*. The average mean diameter of gate openings 54₁ here is 0.5–5 µm, typically 1 µm. The average density of openings 54₁ again is $10^6$–$10^8$ openings/cm², typically $10^7$ opening/cm².

Figure 21B:
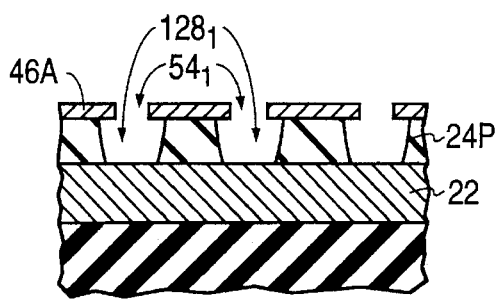
Figure 21C:
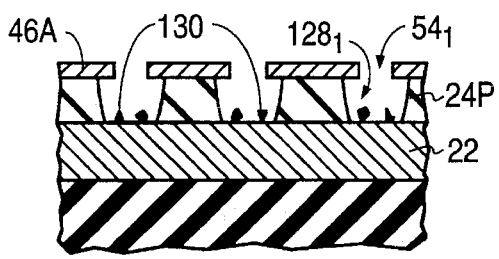

Insulating track layer 24 is etched through gate openings 54₁ to create dielectric open spaces 128₁ down to lower non-insulating region 22 as depicted in FIG. 21*b*. A group of preformed particles 130 are introduced into each dielectric open space 128₁ and then distributed uniformly across region 22 at the bottoms of open spaces 128₁ so that particles 130 again are laterally separated from one another and are securely fixed, and electrically coupled to, region 22. See FIG. 21*c*. The distributing step is performed in the manner described above. If particles 130 are not electron emissive prior to being introduced into open spaces 128₁, particles 130 can be made electron-emissive during or after bonding to region 22.

Figure 21D:
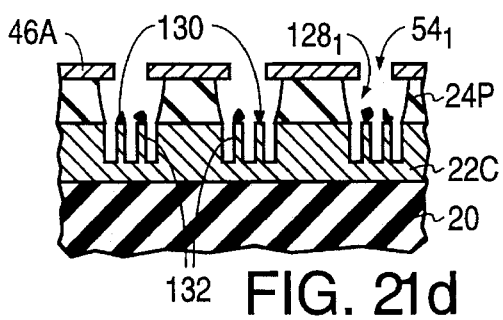

Material of non-insulating region 22 not covered (or not shadowed) by particles 130 is removed to a depth less than the thickness of region 22 to create electrically non-insulating pedestals 132 respectively below particles 130 as shown in FIG. 21*d*. The removal operation is preferably done in the manner described in Twichell et al, cited above. In particular, the removal operation typically entails milling or anisotropically etching region 22 using particles 130 as masks. The side surface of each pedestal 132 extends vertically or, in going from top to bottom (i.e., downward), slopes inward to a point at or just above the bottom of pedestal 132.

The mean height of pedestal 132 is 0.1–2 µm, typically 0.5 µm. The combination of each pedestal 132 and overlying electron-emissive particle 130 constitutes an electron-emissive pillar. Item 22C in. FIG. 21*d* is the remainder of lower non-insulating region 22.

Figure 21E:
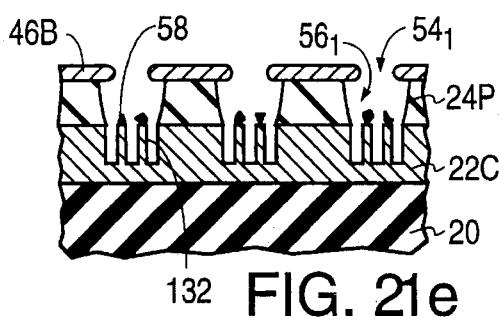

An electropolishing step can again be performed to round the edges of gate layer 46A. FIG. 21*e* shows the final gated field emitter. Because dielectric open spaces 128₁ are centered on gate openings 54₁, electron-emissive pillars 130/132 in each open space 128₁ are, as a group, centered on overlying gate opening 54₁.

Figure 22A:
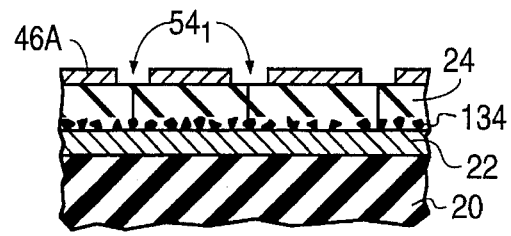
FIGS. 22a–22c are cross-sectional front views representing a set of steps performable on a variation of the structure in FIGS. 5f and 6f for manufacturing a gated area field emitter according to the invention.
Figure 22B:
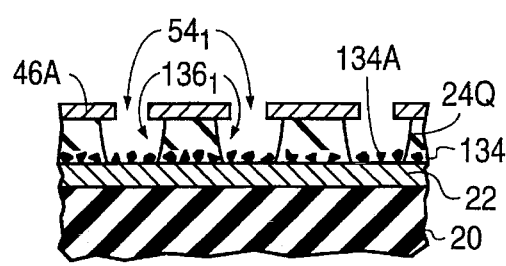
Figure 22C:
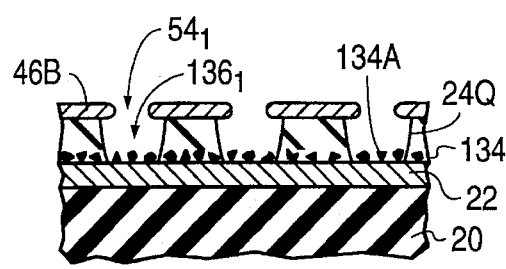

FIGS. 22*a*–22*c* (collectively "FIG. 22") illustrate part of a procedure for manufacturing a gated field emitter having a structure very similar to that of FIGS. 19*d* and 20*d*. FIG. 22*a* depicts a fabrication stage analogous to the stage shown in FIG. 19*a*, and thus the stage shown in FIG. 5*f*, except that a layer of laterally separated particles 134 is situated along the interface between lower non-insulating region 22 and insulating track layer 24. The structure of FIG. 22*a* is created according to the fabrication process of FIGS. 5 and 6 except that preformed particles 134 are distributed across the upper surface of region 22 prior to the deposition of insulating track layer 24—i.e., between the stages shown in FIGS. 5*a* and 5*b*.

Particles 134 are distributed across non-insulating region 22 in such a way that they are securely fixed to, and electrically coupled to, region 22. The distribution step typically entails dispersing particles 134 across region 22 in a random manner and then bonding particles 134 to region 22 using electrically non-insulating particle bonding material (not shown). Particle 134 preferably have the characteristics described above for particles 130. In one embodiment, the distribution of particles 134 across region 22 is performed as disclosed in Twichell et al, cited above.

Using non-insulating layer 46A as a mask, insulating track layer 24 is etched through gate openings 54₁ substantially down to lower non-insulating region 22 to form corresponding dielectric open spaces 136₁ as shown in FIG. 22*b*. A group 134A of particles 134 is thereby exposed at the bottom of each open space $136_1$. If gate openings $54_2$ are present in non-insulating layer 46A, track layer 24 is simultaneously etched through gate openings $54_2$ to create electrically inconsequential dielectric open spaces $136_2$ (not shown) down to, and possibly partially into, insulating substrate 20. Dielectric open spaces $136_1$ and $136_2$ (collectively "136") normally extend laterally under gate layer 46A generally in the illustrated manner but could have their sidewalls vertically aligned with the edges of layer 46A.

Particles 134 preferably are electron emissive before being dispersed across lower non-insulating region 22. Alternatively, at least particles 134A can be made electron emissive at some later point, including subsequent to the formation of dielectric open spaces 136. In either case, particles 134A serve as electron-emissive elements. The edges of patterned gate layer 46A can be rounded by an electropolishing operation. The final gated field emitter shown in FIG. 22c is quite similar to that of FIG. 19a.

The variations described above with respect to particles 130 can generally be applied to particles 134. Also, subject to increasing the thickness of lower non-insulating region 22, the structure of FIG. 22c can be further processed according to the steps described for FIGS. 21d and 21e to produce a gated field emitter having pillared electron-emissive elements consisting of particles 134 on underlying pedestals.

FIGS. 23a–23h (collectively "FIG. 23") and FIGS. 24a–24d (collectively "FIG. 24") illustrate a process for manufacturing a gated area field-emission cathode structure using charged-particle tracks and emitter etching according to the teachings of the invention. The field-emission structure of FIGS. 23 and 24 is typically utilized to excite phosphors on a faceplate in a CRT of a flat-panel display such as a flat-panel television screen or video monitor.

The starting point for the fabrication process is a substrate 140 typically created from a plate having a largely flat upper surface and a largely flat lower surface (not shown) extending substantially parallel to the upper surface. See FIG. 23a. Substrate 140 normally consists, at least along its upper surface, of electrically resistive (intrinsic or lightly doped) semiconductor material or/and electrically insulating material. The resistive semiconductor material preferably is silicon but can be germanium or gallium arsenide. The insulating material is ceramic or/and glass.

Figure 23A:
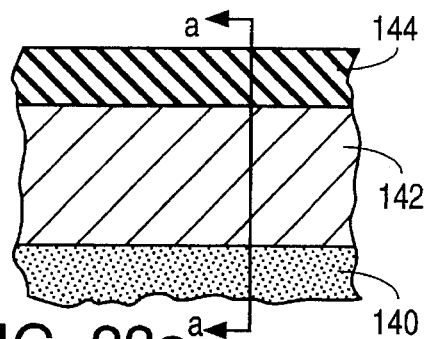
FIGS. 23a–23j, are cross-sectional front views representing steps in fabricating a gated area field emitter according to the invention.

An electrically non-insulating emitter layer 142 is provided along the top of substrate 140 as indicated in FIG. 23a. Emitter layer 142 preferably consists of an electrical conductor, specifically conductively doped semiconductor material or/and metal. The conductively doped semiconductor material typically is silicon of n-type or p-type conductivity but can be germanium or gallium arsenide. When substantially all of layer 142 is conductively doped silicon, the emitter thickness is 0.1–1 μm, typically 0.2 μm. For the case in which metal is used to form layer 142, the metal is typically titanium.

Emitter layer 142 is configured and used in largely the same way as lower non-insulating region 22 above. In particular, layer 132 is typically a patterned layer containing a group of parallel emitter lines.

Figure 25A:
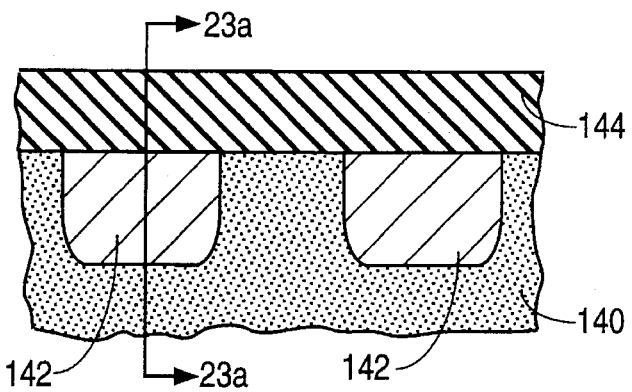
FIGS. 25a and 25b are cross-sectional side views respectively corresponding to FIGS. 23a and 23j for an embodiment in which the emitter lines are conductively doped regions formed in an electrically resistive semiconductor substrate. The cross sections of FIGS. 23a and 23j are respectively taken through planes 23a—23a and 23j—23j in FIGS. 25a and 25b. The cross section of FIG. 25a is taken through plane a—a in FIG. 23a. The cross section of FIG. 25b is taken through stepped plane b—b in FIGS. 23j and 24d.
Figure 26A:
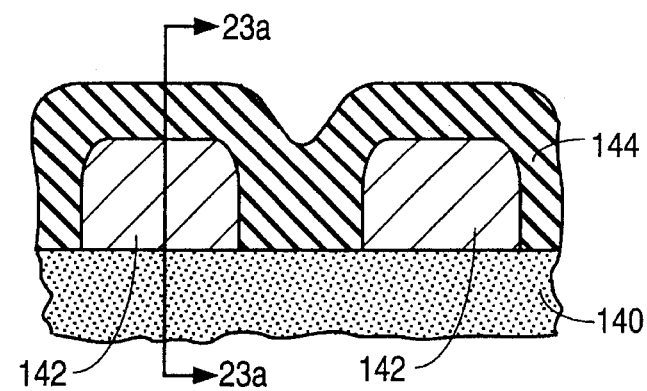
FIGS. 26a and 26b are cross-sectional side structural views respectively corresponding to FIGS. 23a and 23j for an embodiment in which the emitter lines consist of metal or conductively doped semiconductor material formed on an electrically insulating or resistive substrate. The cross sections of FIGS. 23a and 23j are respectively taken through planes 23a—23a and 23j—23j in FIGS. 26a and 26b. The cross section of FIG. 26a is taken through plane a—a in FIG. 23a. The cross section of FIG. 26b is taken through stepped plane b—b in FIGS. 23j and 24d.

If substrate 140 consists of electrically resistive semiconductor material at least along the upper substrate surface, the emitter lines typically consist of conductively doped semiconductor material created by selectively introducing suitable dopant into the resistive semiconductor material. FIG. 25a depicts a vertical cross section through the structure of FIG. 23a for such an embodiment. FIG. 26a depicts a vertical cross section through the structure of FIG. 23a for an embodiment in which the emitter lines consist of metal or conductively doped semiconductor material formed on top of substrate 140.

An electrically insulating track (or track-recording) layer 144 is formed on top of the structure. Parts of track layer 144 are situated on both substrate 140 and emitter layer 142. The thickness of layer 144 is 0.1–2 μm, typically 0.5 μm, depending on the desired diameter of apertures later formed through layer 144. Suitable materials for layer 134 are the same as those listed above for insulating track layer 24.

Figure 23B:
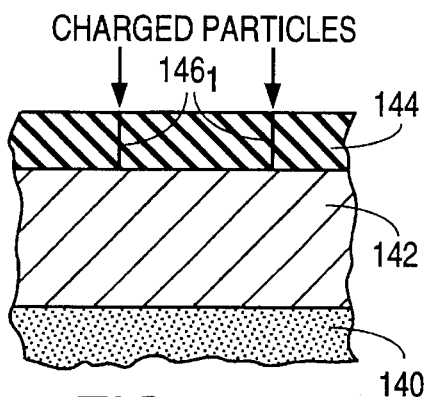
Figure 23C:
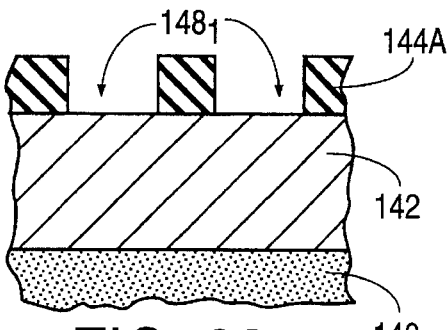
Figure 24A:
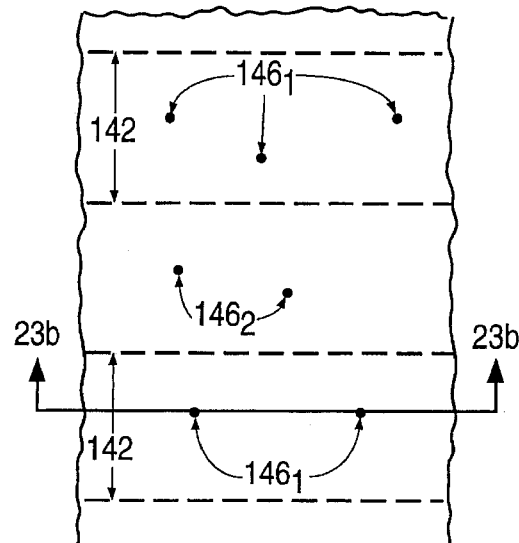
FIGS. 24a–24d are plan views respectively corresponding to FIGS. 23b, 23c, 23f, and 23j. The cross sections of FIGS. 23b, 23c, 23f, and 23j are respectively taken through planes 23b—23b, 23c—23c, 23f—23f, and 23j—23j in FIGS. 24a–24d.

The structure is subjected to energetic charged particles that impinge on top of track layer 144 in a direction largely perpendicular to the (unshown) flat lower surface of substrate 140 and thus in a direction generally perpendicular to the upper structural surface. The charged particles have sufficient energy to pass fully through layer 144 so as to form straight tracks through layer 144 at random locations across layer 144. FIGS. 23b and 24a illustrate the track formation. The charged-particle tracks constitute damaged zones along the particle paths.

The charged-particle tracks are indicated by reference symbols beginning with "146" in FIGS. 23b and 24a. Although the charged particles also pass through emitter layer 142 (and typically into substrate 140), the charged particles do not significantly damage layer 142 and therefore do not create charged-particle tracks through layer 142. Two of the lines that typically form layer 142 are shown in dashed form in FIG. 24a. As indicated there, the tracks fall into two categories: (a) tracks $146_1$ extending through portions of layer 144 overlying emitter layer 142 and (b) tracks $146_2$ extending through portions of layer 144 situated directly on substrate 140 to the sides of layer 142.

As with charged-particle tracks 26 above, charged-particle tracks $146_1$ and $146_2$ (collectively "146") extend parallel to one another in a direction generally perpendicular to the upper structural surface. Tracks 146 have similar characteristics, to, and are formed according to the same techniques as, tracks 26. The density of tracks 146 likewise is $10^6$–$10^9$ tracks/cm$^2$, typically $10^7$–$10^8$ tracks/cm$^2$. For illustrative purposes, only a small portion of tracks 146 is indicated in FIGS. 23b and 24a.

The damaged insulating material along tracks 146 is removed by bringing track layer 144 into contact with a suitable chemical etchant that attacks the damaged track material much more than the undamaged material of layer 144. As a result, generally circular pores are etched through layer 144 along tracks 146 down to emitter layer 142. The etchant preferably does not significantly attack any other parts of the field-emission structure.

The etch is continued into the largely undamaged material of track layer 144 to broaden the pores. Apertures $148_1$ and $148_2$ (collectively "148") are thereby respectively created along tracks $146_1$ and $146_2$. See FIGS. 23c and 24b. Apertures $148_1$ expose corresponding portions of the upper surface of emitter layer 142.

Figure 24B:
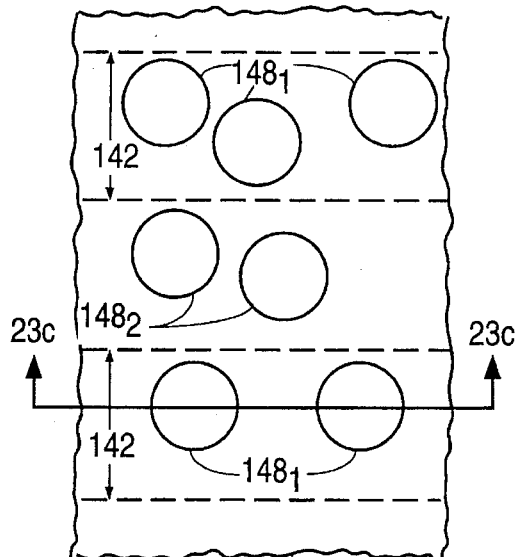

The full etch of track layer 144 is performed in a laterally uniform manner. Accordingly, each aperture 148 is generally circular in plan view as indicated in FIG. 24b. Each aperture 148 is also centered on corresponding track 146. The thickness of layer 144 is reduced during the etch.

The second part of the insulating-material etch can be done with the etchant used during the first part or with another etchant. In either case, components 140 and 142 are not significantly attacked during the second part of the etch. When track layer 144 consists of a polymer, both parts of the etch are preferably done with sodium hydroxide or potassium hydroxide.

Apertures 148 reach an average mean diameter of 0.1–2 µm, typically 0.2 µm, along the bottom of the reduced-thickness remainder 144A of track layer 144. The aperture diameter is substantially the same for all of apertures 148. For illustrative purposes, the lateral dimensions of apertures 148 compared to the widths of the lines that form emitter layer 142 are greatly exaggerated in the plan-view drawings.

Apertures $148_2$, which extend through portions of track layer 144A lying directly above substrate 140, do not significantly affect device operation. Accordingly, apertures $148_2$ are not discussed further below or shown in any of the remaining drawings. In fact, the creation of apertures $148_2$ could be avoided by using an appropriate mask during either the trackformation step or the aperture-etch step.

Figure 23D:
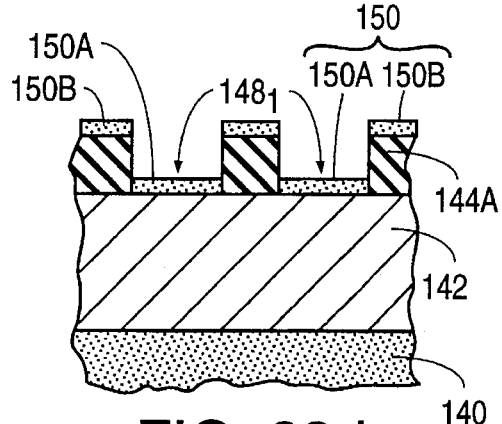
Figure 23E:
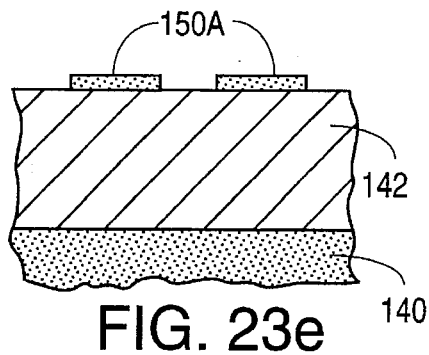

A cap layer 150 is deposited on top of the structure as shown in FIG. 23d. Cap layer 150 contains (a) main cap regions 150A situated on emitter layer 142 at the bottoms of apertures 148I and (b) a further cap region 150B situated on top of track layer 144A. Cap layer 150 may be formed with electrically insulating material or with electrically non-insulating material (or even with both types of material). For example, layer 150 typically consists of a metal such as chromium when emitter layer 132 is conductively doped silicon.

Cap layer 150 may be deposited by evaporating or sputtering the desired cap material. Alternatively, main cap regions 150A can be formed by a selective deposition technique such as electrochemical deposition. In this case, substantially none of the cap material accumulates on track layer 144A—i.e., further cap region 150B is not formed.

The thickness of cap layer 150 is less than the thickness of track layer 144A. Specifically, the cap thickness is 0.05–1 µm, typically 0.2 µm. Although not shown in FIG. 23d, small pieces of the cap material may accumulate along the sidewalls of track layer 144A above main cap regions 150A. To the extent that such sidewall cap pieces are formed and not removed during the track-material dissolving operation described below, these sidewall cap pieces are removed according to a conventional technique that may slightly reduce the thickness of regions 150A and 150B.

The structure is subjected to an agent that dissolves track layer 144A but does not significantly affect cap layer 150 or any of the other structural components. All of layer 144A is removed during the etch. Further cap region 150B (when present) is lifted off during the removal of layer 144A to produce the structure shown in FIG. 23e. When layer 144A consists of a polymer such as polycarbonate, the dissolving step is performed with chloroform. A dilute hydrofluoric acid solution is used as the dissolving agent when layer 144A is glass. Since remaining cap regions 150A were formed in apertures 148I, cap regions 150A are respectively centered on the locations of charged-particle tracks $146_1$.

Next, the structure is etched with an etchant that attacks emitter layer 142 but does not significantly attack cap regions 150A. The emitter etch is performed in such a way as to uniformly remove (a) emitter material not covered by cap regions 150A and (b) laterally adjacent emitter material extending partway under regions 150A, thereby creating a depression 152 in layer 142. See FIGS. 23f and 24c. Regions 150A act as etch masks to control the lateral extent of the etch. The etchant preferably is a reactive-ion etchant.

Figure 23F:
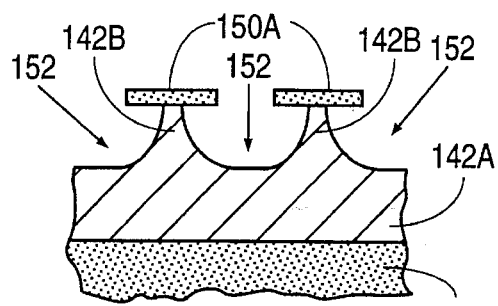

The emitter etch is conducted for a time sufficiently long to underetch a large fraction of lower surface of each cap region 150A but not long enough for depression 152 to reach substrate 140 or for the tops of the sidewalls of depression 150 to form points below regions 150A. As a result, regions 150A remain in place. Item 142A in FIG. 23f is the remainder of emitter layer 142. Along the upper surface of remaining emitter layer 142A, depression 152 defines truncated generally conical emitter portions 142B in layer 142A. Because the etch is done uniformly, each emitter portion 142B is centered on, and thereby aligned to, overlying cap region 150A.

Figure 23G:
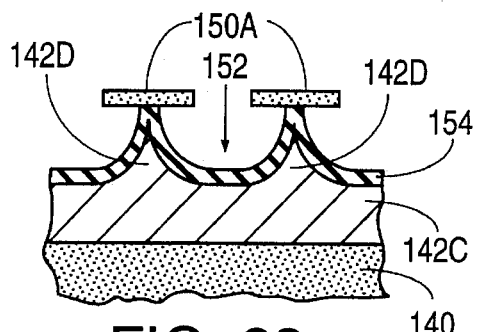

Emitter portions 142B are sharpened by reacting emitter material along the upper surface of layer 142A with one or more other materials to form a layer 154 consisting of a compound of these materials. FIG. 23g shows the resultant structure. Item 142C is the remainder of emitter layer 142A. The reaction process consumes an amount of emitter material sufficient to enable generally conical electron-emissive portions 142D to be defined in the emitter material along the upper surface of layer 142C. Each emitter portion 142D has a sharply pointed tip directed towards a corresponding one of cap regions 150A.

Emitter portions 142D are generally cones even though their side surfaces are concave as viewed from the side. Each electron-emissive cone 142D is centered on overlying cap region 150A and therefore on the location of corresponding charged-particle track $146_1$. Cones 142D have an average height of 0.1–2 µm, typically 0.2 µm. The base diameter of cones 142 is approximately the same as that of cap regions 150A and, accordingly, approximately the same as that of apertures $148_1$. That is, cones 142D have an average mean base diameter of 0.1–2 µm, typically 0.2 µm.

Compound layer 154 is preferably an oxide of the emitter material. The emitter oxide is typically created by exposing the structure to an oxygen-containing gas, such as wet or dry oxygen, at high temperature. When emitter layer 142C is conductively doped silicon, layer 154 is silicon oxide. Likewise, layer 154 is a metal oxide when layer 142C is metal.

Figure 23H:
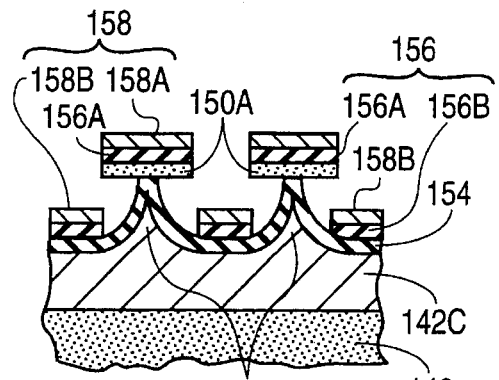

Electrically insulating material is deposited on the structure by causing the constituents of the insulating material to move towards the upper surface of the structure in a direction largely perpendicular to the lower structural surface. As shown in FIG. 23h, portions 156A of the insulating material accumulate on cap regions 150A. A portion 156B of the insulating material accumulates on the portion of compound layer 154 not covered (or not shadowed) by regions 150A. Insulating portions 156A and 156B together constitute a discontinuous insulating layer 156. The deposition of insulating layer 156 is typically performed by sputtering or chemical vapor deposition. Layer 156 typically consists of silicon oxide.

Next, electrically non-insulating gate material is similarly deposited on the upper surface of the structure in a direction generally perpendicular to the lower structural surface. As also shown in FIG. 23h, portions 158A and 158B of the gate material respectively accumulate on insulating portions 156A and 156B. Gate portions 158A and 158B together form a discontinuous gate layer 158. The deposition of gate layer 158 is typically performed by sputtering or evaporation. Layer 158 usually consists of an electrical conductor, typically a metal such as molybdenum. Layer 158 could also be formed with conductively doped semiconductor material such as n-type or p-type polycrystalline silicon. The composite thickness of insulating layer 156 and gate layer 158 is less than the height of emitter cones 142D.

Figure 23I:
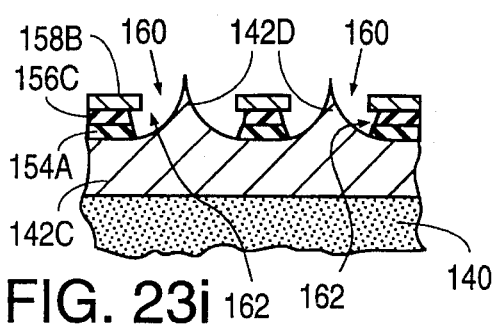

Cap regions 150A are removed by subjecting the structure to an etchant that attacks the exposed material of compound layer 154 under cap regions 150A but does not significantly attack the gate material or emitter layer 142C. For example, a buffered hydrofluoric acid solution can again be employed when layer 154 consists of silicon oxide. The portions of layer 154 lying below cap regions 150A are thereby removed. As a result, regions 150A are lifted off along with overlying insulating portions 156A and gate portions 158A. The etching of layer 154 normally extends slightly under gate portions 156A. FIG. 23i depicts the resultant structure in which item 154A is the remainder of layer 154.

The etchant typically attacks the side edges of insulating portions 156B so as to slightly undercut remaining gate portion 158B. Item 156C in FIG. 23i is the remainder of portion 156B. Of course, layer 156B will remain fully in place to support gate portion 158B if the etchant does not attack layer 156B.

Remaining gate portion 158B forms a patterned gate layer. Emitter cones 142D preferably extend partially through gate openings 160 in patterned gate layer 158B. Because cap regions 150A were respectively centered on cones 142D, gate openings 160 are respectively centered on, and thus aligned to, cones 142D.

Remaining insulating portion 156C (or 156B) forms a patterned insulating layer through which dielectric openings 162 extend. If remaining compound portion 54A consists of insulating material, portion 154A forms part of this patterned insulating layer. As with gate openings 160, dielectric openings 162 are centered on cones 142D as the result of the self alignment that occurs during the fabrication process. Since each cone 142D is centered on the location of corresponding charged particle track $146_1$, each gate opening 160 and underlying dielectric opening 162 are centered on the location of corresponding track $146_1$.

Figure 23J:
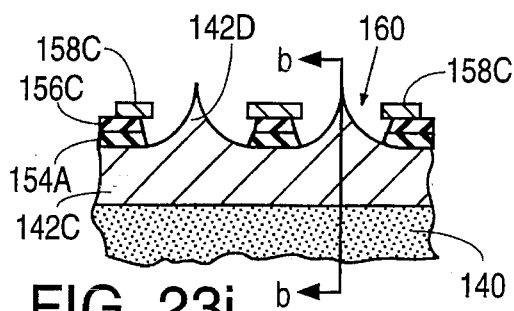
Figure 24C:
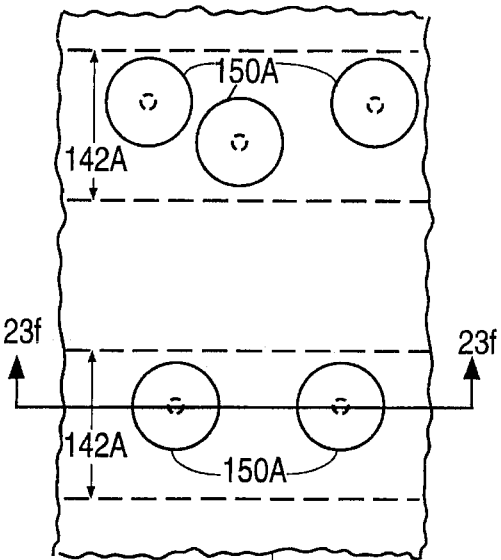
Figure 24D:
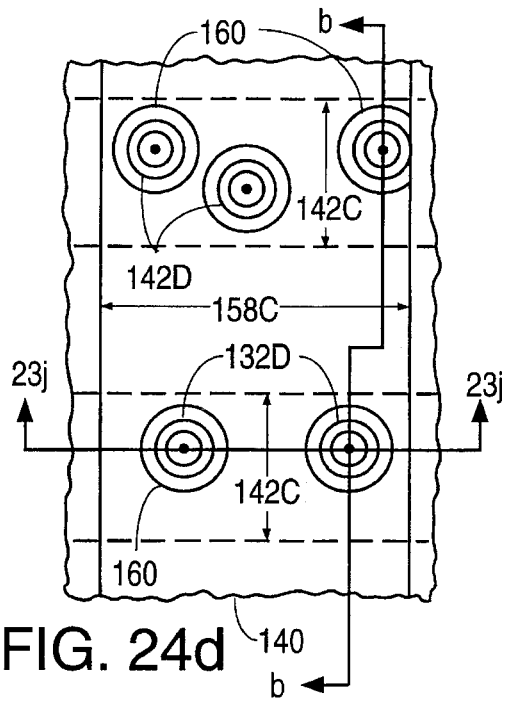

Using a suitable photoresist mask (not shown) gate layer 158B is patterned into a group of lines extending perpendicular to the lines that form emitter layer 142C. FIGS. 23j and 24d depict the final structure in which item 158C is the patterned remainder of gate layer 158B. FIG. 24d illustrates one of the lines that form patterned gate layer 158C. Emitter cones 142D are electron-emissive elements which, in combination with the underlying structural components, form a gated field emitter.

Figure 25B:
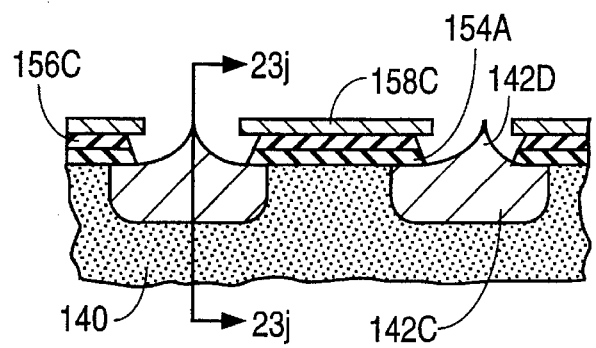
Figure 26B:
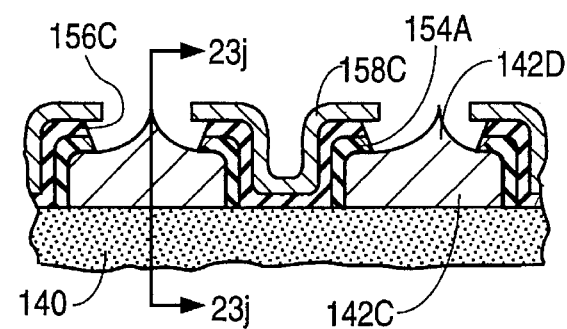

FIGS. 25b and 26b illustrate typical vertical cross sections through the final structure of FIGS. 23j and 24d. FIG. 25b represents the embodiment where emitter lines 142 are conductively doped regions created in electrically resistive semiconductor material. FIG. 26b represents the embodiment where lines 142 consist of metal or conductively doped semiconductor material formed on substrate 140.

As with lower non-insulating region 22 in the earlier-described field emitters of the invention, emitter layer 142 in the field emitter of FIGS. 23j and 24d, could be provided as a lower electrically conductive sublayer and an upper electrically resistive sublayer. The conductive sublayer would be formed with one or more of the electrical conductors described above for layer 142. The resistive sublayer would typically consist of cermet or lightly doped polycrystalline silicon.

The field emitters of the present invention operate in the following way when used in a flat-panel CRT display where emitter layer 142 (in the embodiment of FIGS. 23j and 24d) or lower non-insulating region 22 (in the other embodiments) contains emitter lines that are situated below, and cross, lines of the gate layer. An anode (or collector) structure is situated a short distance away from the top of each emitter. The anode is maintained at high positive voltage relative to the gate and emitter lines.

When a suitable voltage is applied between (a) a selected one of the gate lines and (b) a selected one of the emitter lines, the selected gate line extracts electrons from the electron-emissive elements at the intersection of the two selected lines and controls the magnitude of the resulting electron current. Desired levels of electron emission typically occur when the applied gate-to-emitter electric field reaches 20 volt/μm or less at a current density of 1 mA/cm$^2$ as measured at the phosphor-coated faceplate of the flat-panel display. The extracted electrons are subsequently collected at the anode.

Directional terms such as "lower" and "down" have been employed in describing the present invention to establish a frame of reference by which the reader can more easily understand how the various parts of the invention fit together. In actual practice, the components of a field emitter may be situated at orientations different from that implied by the directional terms used here. The same applies to the way in which the fabrication steps are performed in the invention. Inasmuch as directional terms are used for convenience to facilitate the description, the invention encompasses implementations in which the orientations differ from those strictly covered by the directional terms employed here.

The various electron-emissive elements and charged-particle tracks (or track segments) have longitudinal axes (not shown). Each electron-emissive element is generally symmetric about its longitudinal axis. A reference to an etch as being performed along a charged-particle track through a track layer means that the removed material occupied a volume containing at least part of the track's longitudinal axis in the track layer.

While the invention has been described with reference to particular embodiments, this description is solely for the purpose of illustration and is not to be construed as limiting the scope of the invention claimed below. For example, the gated area electron emitters of the invention have been described as operating according to the field-emission mode in which selected parts of the patterned gate electrode are furnished with voltage sufficient to extract electrons from selected electron-emissive elements. Nonetheless, another mechanism such as photoemission or thermionic emission could be employed to cause part or all of the electron emission. In such embodiments, selected parts of the gate electrode typically collect electrons to cut off electron flow to corresponding parts of the anode.

Under certain conditions, the double-source deposition utilized to form conical tips $102_1$ in the fabrication process of FIG. 9 can be replaced with a single-source physical vapor deposition in which only the tip material is deposited. No separate closure material is employed. The same applies to the double-source deposition used to form cones $118_1$ in the process of FIGS. 10 and 11.

Instead of being formed with metal, tips $88D_1$, and cones $102_1$ and $118_1$ could be formed with other electrical conductors such as conductively doped semiconductors. Components $88D_1$, $102_1$, and $118_1$ along with gate layers 34, 40, 46, and 158 could be formed with electrically resistive material such as lightly doped semiconductors. Gate layer 34, 40, or 46 could be patterned into lines running perpendicular to the lines that form region 22.

Each of gate electrodes 34B, 40B, 46B (or 46A), and 158C could be employed to modulate the movement of electrons extracted by the anode. Various modifications and applications may thus be made by those skilled in the art without departing from the true scope and spirit of the invention as defined in the appended claims.

We claim:

1. A method comprising the steps of:

causing charged particles to pass through a track layer to form a multiplicity of charged-particle tracks therethrough;

creating corresponding open spaces through the track layer by a procedure that entails etching the track layer along the charged-particle tracks;

forming electron-emissive elements accessible through the open spaces; and providing a patterned electrically non-insulating gate layer over the electron-emissive elements such that gate openings extend through the gate layer to enable each gate opening to expose at least one of the electron-emissive elements.

2. A method as in claim 1 wherein the electron-emissive elements are operable in field-emission mode.

3. A method comprising the steps of:

causing charged particles to pass through a track layer to form a multiplicity of charged-particle tracks therethrough;

creating corresponding open spaces through the track layer by a procedure that entails etching the track layer along the charged-particle tracks;

forming corresponding electron-emissive elements respectively centered on the open spaces; and providing a patterned electrically non-insulating gate layer over the electron-emissive elements such that a like multiplicity of corresponding gate openings extend through the gate layer at locations respectively centered on the electron-emissive elements.

4. A method as in claim 3 wherein both the centering of the electron-emissive elements on the open spaces and the centering of the gate openings on the electron-emissive elements occur largely in a given direction relative to the track layer.

5. A method as in claim 3 wherein the forming step comprises forming each electron-emissive element at least partly in a corresponding one of the open spaces.

6. A method as in claim 5 wherein the forming step comprises forming the electron-emissive elements over a lower electrically non-insulating region situated below the track layer such that each electron-emissive element is electrically coupled to the lower non-insulating region through the corresponding open space.

7. A method as in claim 5 wherein:

the creating step entails creating the open spaces generally in the shape of pores respectively centered on the charged-particle tracks; and the forming step entails introducing electrically non-insulating filament material into the pores to form the electron-emissive elements generally in the shape of filaments.

8. A method as in claim 3 wherein the forming step comprises defining the electron-emissive elements in an electrically non-insulating emitter region provided below the track layer.

9. A method as in claim 8 wherein the defining step comprises:

using the open spaces to define corresponding cap regions over the emitter layer;

removing the track layer; and removing (a) selected material of the emitter layer using the cap regions as masks to control the removal of the selected material such that corresponding electron-emissive elements are defined in the remainder of the emitter layer at locations respectively centered on the cap regions and (b) the cap regions.

10. A method as in claim 9 wherein:

the using step comprises forming the cap regions in the apertures; and the second-mentioned removing step entails removing selected material of the emitter layer below the cap regions in order to create the electron-emissive elements generally in the shape of cones pointing respectively toward the cap regions.

11. A method comprising the steps of:

causing charged particles to pass through an electrically insulating track layer to form a multiplicity of charged-particle tracks therethrough;

creating corresponding open spaces through the track layer by a procedure that entails etching the track layer along the charged-particle tracks;

forming corresponding electron-emissive elements over a lower electrically non-insulating region lying below the track layer such that each electron-emissive element is electrically coupled to the lower non-insulating region through the corresponding open space; and providing a patterned electrically non-insulating gate layer over the track layer such that a like multiplicity of gate openings extend through the gate layer at locations respectively centered on the electron-emissive elements.

12. A method as in claim 11 wherein:

the creating step entails creating the open spaces generally in the shape of pores respectively centered on the charged-particle tracks; and the forming step entails introducing electrically non-insulating filament material into the pores to form the electron-emissive elements generally in the shape of filaments.

13. A method as in claim 12 wherein the introducing step comprises electrochemically depositing the filament material into the pores starting from the lower non-insulating region.

14. A method as in claim 12 wherein the providing step comprises:

producing caps over the upper ends of the filaments, each cap being situated over one of the filaments and having a lateral periphery that encloses the lateral periphery of the underlying filament along the bottom of that cap;

removing part of the thickness of the track layer;

depositing electrically conductive gate material over the remainder of the track layer in the space generally below the space between the caps; and removing the caps including any of the gate material on the caps, whereby the gate layer comprises the remaining gate material.

15. A method as in claim 12 wherein the providing step comprises:

producing caps over the upper ends of the filaments, each cap being situated over one of the filaments and having a lateral periphery that encloses the lateral periphery of the underlying filament along the bottom of that cap;

forming the gate layer in the space between the caps; and substantially removing the caps.

16. A method that comprises the following steps for manufacturing electrodes of an electronic device:

causing charged particles to pass through a track layer to form a multiplicity of charged-particle tracks therethrough;

creating corresponding apertures through the track layer by a procedure that entails etching the track layer along the charged-particle tracks;

etching an underlying electrically non-insulating layer through the apertures to form corresponding further apertures through the non-insulating layer; and etching an underlying electrically insulating layer through the further apertures to form corresponding dielectric open spaces through the insulating layer down to an underlying lower electrically non-insulating region.

17. A method as in claim 16 further including the steps of:

patterning at least part of the lower non-insulating region into a group of lower lines extending in a first direction; and patterning at least part of the non-insulating layer into a group of lines extending above the lower lines in a second direction different from the first direction.

18. A method as in claim 17 wherein the apertures and open spaces are generally circular.

19. A method comprising the steps of:

causing charged particles to pass through a track layer to form a multiplicity of charged-particle tracks therethrough;

creating corresponding apertures through the track layer by a procedure that entails etching the track layer along the charged-particle tracks;

etching an underlying electrically non-insulating gate layer through the apertures to form corresponding gate openings through the gate layer; and etching an underlying electrically insulating layer through the gate openings to form corresponding dielectric open spaces substantially through the insulating layer down to locations for electron-emissive elements along an underlying lower electrically non-insulating region.

20. A method as in claim 19 further including the step of providing the electron-emissive elements over the lower non-insulating region such that they are electrically coupled to it.

21. A method as in claim 20 wherein the providing step entails furnishing each dielectric open space with a plurality of the electron-emissive elements.

22. A method as in claim 20 wherein the providing step entails furnishing each dielectric space with a single one of the electron-emissive elements.

23. A method as in claim 20 wherein the providing step further entails depositing material through the gate openings in a manner centered on the gate openings to at least partially form the electron-emissive elements.

24. A method as in claim 23 wherein the providing step is performed after the insulating-layer etching step, at least one of the electron-emissive elements being at least partially provided within each dielectric open space.

25. A method as in claim 20 wherein the providing step is performed before the insulating-layer etching step, at least one of the electron-emissive elements being exposed through each dielectric open space.

26. A method as in claim 20 further including the steps of:

distributing electron-emissive particles over the lower non-insulating region such that the particles are electrically coupled to it; and removing part of the lower non-insulating region using the particles as masks to protect underlying material of the lower non-insulating region in order to form corresponding pedestals respectively below the particles, each electron-emissive element comprising one of the particles and the underlying one of the pedestals.

27. A method as in claim 26 wherein the removing step is performed subsequent to the insulating-layer etching step.

28. A method as in claim 19 wherein the electron-emissive elements are operable in field-emission mode.

29. A method comprising the steps of:

causing charged particles to pass through a track layer to form a multiplicity of charged-particle tracks therethrough;

creating corresponding apertures through the track layer by a procedure that entails etching the track layer along the charged-particle tracks;

providing a patterned electrically non-insulating gate layer such that a like multiplicity of gate openings extend through the gate layer at locations respectively centered on the apertures; and forming a like multiplicity of electron-emissive elements respectively centered on the gate openings.

30. A method as in claim 29 wherein both the centering of the gate openings on the apertures and the centering of the electron-emissive elements on the gate openings occurs largely in a given direction relative to the gate layer.

31. A method as in claim 29 wherein the providing step entails etching the gate layer through the apertures to form the gate openings.

32. A method as in claim 31 further including the step of etching an underlying electrically insulating layer through the gate openings to form corresponding dielectric open spaces through the insulating layer.

33. A method as in claim 32 wherein:

charged particles also pass through the gate and insulating layers during the causing step such that each track is an upper segment of a composite charged-particle track that includes a lower segment which extends through the insulating layer in line with the upper track segment; and the insulating layer is etched along the lower track segments.

34. A method as in claim 29 wherein the forming step entails depositing material through the gate openings in a manner centered on the gate openings to at least partially form the electron-emissive elements over a lower electrically non-insulating region.

35. A method comprising the steps of:

causing charged particles to pass through a track layer to form a multiplicity of charged-particle tracks therethrough;

creating corresponding apertures through the track layer by a procedure that entails etching the track layer along the charged-particle tracks;

etching an underlying electrically non-insulating gate layer through the apertures to form corresponding gate openings through the gate layer; and forming a like multiplicity of electron-emissive elements over a lower electrically non-insulating region that lies below an electrically insulating layer lying below the gate layer such that each electron-emissive element is electrically coupled to the lower non-insulating region through a corresponding dielectric open space extending through the insulating layer, the electron-emissive elements being respectively centered on the gate openings.

36. A method as in claim 35 further including the step of etching the insulating layer through the gate openings to form the dielectric open spaces.

37. A method as in claim 35 wherein:

charged particles also pass through the gate and insulating layers during the causing step such that each track is an upper segment of a composite charged-particle track that includes a lower segment which extends through the insulating layer in line with the upper track segment; and the insulating layer is etched along the lower track segments.

38. A method as in claim 35 wherein the forming step entails depositing material through the gate openings in a manner centered on the gate openings to at least partially form the electron-emissive elements.

39. A method as in claim 35 wherein each electron-emissive element comprises electrically non-insulating material generally in the shape of an electron-emissive cone that points away from the lower non-insulating region.

40. A method as in claim 39 wherein each electron-emissive element further includes an electrically non-insulating pedestal situated between the lower non-insulating region and that element's cone.

* * * * *